United States Patent
Moore et al.

(10) Patent No.: US 9,495,046 B2
(45) Date of Patent: Nov. 15, 2016

(54) PARASITIC CAPACITANCE FILTER FOR SINGLE-LAYER CAPACITIVE IMAGING SENSORS

(71) Applicant: Synaptics Incorporated, San Jose, CA (US)

(72) Inventors: Tyler Moore, Redwood City, CA (US); Derek Solven, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 129 days.

(21) Appl. No.: 14/061,593

(22) Filed: Oct. 23, 2013

(65) Prior Publication Data

US 2015/0109233 A1   Apr. 23, 2015

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04104* (2013.01)

(58) Field of Classification Search
CPC ................... G06F 3/044; G06F 3/0416; G06F 3/0418
See application file for complete search history.

(56) References Cited

U.S. PATENT DOCUMENTS

| | | |
|---|---|---|
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |

(Continued)

FOREIGN PATENT DOCUMENTS

| | | |
|---|---|---|
| WO | WO-8606551 A1 | 11/1986 |
| WO | WO-0057344 A1 | 9/2000 |

(Continued)

*Primary Examiner* — Dorothy Harris
(74) *Attorney, Agent, or Firm* — Patterson + Sheridan, LLP

(57) ABSTRACT

An approach is provided for estimating and correcting parasitic responses of a touch sensor device. The input device measures a first capacitance signal generated by a first pixel that is covered at least partially by an input object. The input device measures a second capacitance signal generated by a second pixel that is covered at least partially by the input object. The input device measures a third capacitance signal generated by a third pixel. Based on at least the first capacitance signal and the second capacitance signal, the input device identifies a position of the input object within the sensing region. Based on the position of the input object, the input device identifies a trace covered by the input object and associated with the third pixel. The input device calculates an updated third capacitance signal by subtracting a correction amount from the third capacitance signal.

10 Claims, 10 Drawing Sheets

(56) References Cited

U.S. PATENT DOCUMENTS

| | | |
|---|---|---|
| 7,339,579 B2 | 3/2008 | Richter et al. |
| 7,348,967 B2 | 3/2008 | Zadesky et al. |
| 7,382,139 B2 | 6/2008 | Mackey |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,259,078 B2 | 9/2012 | Hotelling et al. |
| 8,278,571 B2 | 10/2012 | Orsley |
| 8,319,747 B2 | 11/2012 | Hotelling et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0013800 A1* | 1/2010 | Elias et al. .............. 345/178 |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0214247 A1 | 8/2010 | Tang et al. |
| 2010/0258360 A1* | 10/2010 | Yilmaz ............... 178/18.06 |
| 2010/0277433 A1 | 11/2010 | Lee et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0141051 A1 | 6/2011 | Ryu |
| 2011/0169770 A1 | 7/2011 | Mishina et al. |
| 2011/0187666 A1 | 8/2011 | Min |
| 2011/0267300 A1 | 11/2011 | Serban et al. |
| 2011/0273391 A1 | 11/2011 | Bae |
| 2011/0279169 A1 | 11/2011 | Salaverry |
| 2012/0044171 A1 | 2/2012 | Lee et al. |
| 2012/0056820 A1 | 3/2012 | Corbridge |

FOREIGN PATENT DOCUMENTS

| | | |
|---|---|---|
| WO | WO-2010136932 A1 | 12/2010 |
| WO | WO-2010117946 A3 | 1/2011 |

* cited by examiner

PARASITIC CAPACITANCE FILTER FOR SINGLE-LAYER CAPACITIVE IMAGING SENSORS

BACKGROUND OF THE INVENTION

1. Field of the Invention

Embodiments of the present invention generally relate to a system and method for sensing a position of an input object over a sensing region of a proximity sensing device.

2. Description of the Related Art

Input devices including proximity sensor devices, also commonly called touchpads or touch sensor devices, are widely used in a variety of electronic systems. A proximity sensor device typically includes a sensing region in which the proximity sensor device determines the presence, location and/or motion of one or more input objects, such as a finger. Proximity sensor devices may be used to provide interfaces for an electronic system. For example, proximity sensor devices are often used as input devices for larger computing systems, such as opaque touchpads integrated in, or peripheral to notebook or desktop computers. Proximity sensor devices are also often used in smaller computing systems, such as touch screens integrated in cellular phones. Proximity sensor devices are typically used in combination with other supporting components, such as display or input devices found in the electronic or computing system.

In some configurations, the proximity sensor devices are coupled to these supporting components to provide a desired combined function or to provide a desirable complete device package. Many commercially available proximity sensor devices utilize one or more electrical techniques to determine the presence, location and/or motion of an input object, such as a capacitive or a resistive sensing technique. Typically, a capacitive sensing type of proximity sensor device utilizes an array of sensor electrodes and traces to detect the presence, location and/or motion of an input object. A trace is an electronic component that connects a sensor electrode to the controlling electronics found in the proximity sensor device.

During the operation of a capacitive sensing device the presence of an input object over the sensing region of the proximity sensor device, which contains the sensor electrodes and their respective traces, the input object will interfere with the signal provided by the driven electrodes (i.e., transmitter electrodes) and also their respective traces (i.e., transmitter traces). Unfortunately, the coupling between the transmitter electrodes and the receiver electrodes is also affected by the interaction of the signal transmitted from the transmitter traces to the receiver electrodes. Thus, the interaction of an input object and the signal transmitted from the traces will cause an unwanted parasitic response. For example, a finger that is coupled to a particular sensor electrode is also likely to be coupled to traces that are connected to other sensor electrodes that are not positioned such that they will significantly interact with the input object. The controlling electronics in the proximity sensor device incorrectly interprets the coupling between the input object and the traces as a response at the other sensor electrodes that are not positioned to directly couple with the input object. This incorrect interpretation of a response created by the input object and the local traces is known as a parasitic response. The parasitic response causes the controlling electronics to incorrectly determine that one or more phantom input objects are interacting with the proximity sensor device, and affect the controlling electronics ability to determine the actual location of the actual input object.

Moreover, the closer the position of a trace is to a receiver electrode and also the greater the length of the traces used to interconnect the sensor electrodes to the computer system, the more susceptible the proximity sensor device is to a parasitic response. The width of a trace is typically designed to be wider as the length of the trace increases, for example, as the sensor electrode is farther away from the trace interconnecting region typically outside of the sensing region of the proximity sensor device. The parasitic response can thus vary from one type of trace to another, which will also adversely affect the reliability and accuracy of the data collected by the proximity sensing device.

Thus, there is a need for a method and an inexpensive electronic system that can facilitate reliable, consistent and accurate determination of the correct number of input objects and their position within the sensing region.

SUMMARY OF THE INVENTION

Embodiments of the invention provide an approach for estimating and correcting parasitic responses of a touch sensor device. The input device measures a first capacitance signal generated by a first pixel that is covered at least partially by an input object. The input device measures a second capacitance signal generated by a second pixel that is covered at least partially by the input object. The input device measures a third capacitance signal generated by a third pixel. Based on at least the first capacitance signal and the second capacitance signal, the input device identifies a position of the input object within the sensing region. Based on the position of the input object, the input device identifies a trace covered by the input object and associated with the third pixel. The input device calculates an updated third capacitance signal by subtracting a correction amount from the third capacitance signal.

Embodiment of the invention may further provide a computer-implemented method of sensing a position of an input object, comprising determining a first pixel response of a first pixel covered at least partially by an input object, determining a second pixel response of a second pixel covered at least partially by the input object and determining a third pixel response of a third pixel, wherein the first pixel, the second pixel, and the third pixel are disposed within a capacitive sensing region of a touch sensor device. Based on at least the first pixel response and the second pixel response, identifying a position of the input object within the capacitive sensing region, based on the position of the input object. Then determining that the input object is positioned near a first trace, wherein the first trace is associated with the third pixel, and then calculating an updated third pixel response by subtracting a correction amount from the third pixel response after determining that the input object is positioned near the first trace.

Embodiment of the invention may further provide a computer readable storage medium comprising instructions that in response to execution by a computing device cause the computing device to perform operations, comprising determining a first pixel response of a first pixel covered at least partially by an input object, determining a second pixel response of a second pixel covered at least partially by the input object and determining a third pixel response of a third pixel, wherein the first pixel, the second pixel, and the third pixel are disposed within a capacitive sensing region of a touch sensor device. Then based on at least the first pixel response and the second pixel response, identifying a position of the input object within the capacitive sensing region. Based on the position of the input object, determining that the input object is positioned near a first trace, wherein the first trace is associated with the third pixel and calculating an updated third pixel response by subtracting a correction amount from the third pixel response after determining that the input object is positioned near the first trace.

Embodiment of the invention may further provide a method of sensing a position of an input object within a sensing region of an input device, comprising measuring a first capacitance signal generated by a first pixel that is covered at least partially by an input object, measuring a second capacitance signal generated by a second pixel that is covered at least partially by the input object, and measuring a third capacitance signal generated by a third pixel. Then based on at least the first capacitance signal and the second capacitance signal, identifying a position of the input object within the sensing region. Based on the position of the input object, determining that the input object is positioned near a trace, wherein the trace is associated with the third pixel; and calculating an updated third capacitance signal by subtracting a correction amount from the third capacitance signal after determining that the input object is positioned near the trace.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
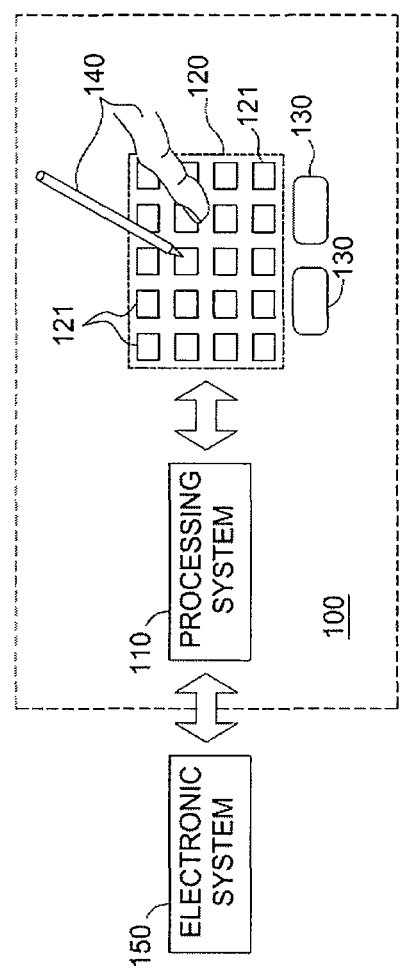
FIG. 1 is a schematic block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

General Overview

Various embodiments of the present invention provide input devices and methods that facilitate improved usability of the input devices. Advantageously, techniques of the present invention also enable an input device to determine more accurately and more reliably a location of an input object covering a capacitive sensing region of the input device. In some implementations, a manufacturer does not need to modify a sensor array set of the input device. Accordingly, the input device can be inexpensive to produce, and can be desirably sized.

An approach is provided for estimating and correcting parasitic responses received by an input device. The input device measures a first capacitance signal generated by a first pixel that is covered at least partially by an input object. The input device measures a second capacitance signal generated by a second pixel that is covered at least partially by the input object. The input device measures a third capacitance signal generated by a third pixel. Based on at least the first capacitance signal and the second capacitance signal, the input device identifies a position of the input object within the sensing region. Based on the position of the input object, the input device identifies a trace covered by the input object and associated with the third pixel. The input device then calculates an updated third capacitance signal by subtracting a correction amount from the third capacitance signal. The correction amount is the estimated parasitic response (e.g., calculated parasitic response). The estimated parasitic response values indicate the amount of response on each pixel that is due to trace coupling to the input object. In some implementations, the input device may use the estimated parasitic response values for applications other than improving accuracy of input object locating algorithms.

System Overview

FIG. 1 is a block diagram of an exemplary input device 100, in accordance with embodiments of the invention. In FIG. 1, the input device 100 is a proximity sensor device (e.g., "touchpad," "touch screen," "touch sensor device") configured to sense inputs provided by one or more input objects 140 positioned in a sensing region 120. Example input objects include fingers and styli, as shown in FIG. 1. In some embodiments of the invention, the input device 100 may be configured to provide input to an electronic system 150, which is sometimes referred to herein as the "host." As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, and IRDA.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. Some implementations are configured to provide sensing images that span one, two, three, or higher dimensional spaces.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing elements 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. In one example, as noted above, actions may include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of a display device (not shown). For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. Some embodiments of the input device 100 include at least part of the display device. For example, some embodiments may utilize some of the same electrical components for displaying and sensing. In some examples, the display screen of the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In many embodiments, the positional information of the input object 140 relative to the sensing region 120 is monitored or sensed by use of one or more sensing elements 121 (FIG. 1) that are positioned to detect its "positional information." In general, the sensing elements 121 may comprise one or more sensing elements or components that are used to detect the presence of an input object. As discussed above, the one or more sensing elements 121 of the input device 100 may use capacitive, elastive, resistive, inductive, magnetic acoustic, ultrasonic, and/or optical techniques to sense the positional information of an input object. While the information presented below primarily discuses the operation of an input device 100, which uses capacitive sensing techniques to monitor or determine the positional information of an input object 140 this configuration is not intended to be limiting as to the scope of the invention described herein, since other sensing techniques may be used.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In one embodiment of the input device 100, the sensing element 121 is a capacitive sensing element that is used to sense the positional information of the input object(s). In some capacitive implementations of the input device 100, voltage or current is applied to the sensing elements to create an electric field between an electrode and ground. Nearby input objects 140 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes," "transmitting electrodes" or "transmitters") and one or more receiver sensor electrodes (also "receiver electrodes" or "receiving electrodes"). Transmitter sensor electrodes may be modulated relative to a reference voltage (e.g., system ground) to transmit transmitter signals. Receiver sensor electrodes may be held substantially constant relative to the reference voltage to facilitate receipt of "resulting signals." A "resulting signal" may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some implementations user input from an actively modulated device (e.g. an active pen) may act as a transmitter such that each of the sensor electrodes act as a receiver to determine the position of the actively modulated device.

Most conventional multi-touch sensing sensor devices, in which the location of more than one finger or other input can be accurately determined, comprise a matrix of transmitter sensor electrodes and receiver sensor electrodes. Conventionally, during operation, capacitive images are formed by measuring the capacitance formed between each transmitter and receiver sensor electrode (referred to as "transcapacitance" or "mutual capacitance"), forming a matrix or grid of capacitive detecting elements across the sensing region 120. The presence of an input object (such as a finger or other object) at or near an intersection between transmitter and receiver sensor electrodes changes the measured "transcapacitance". These changes are localized to the location of object, where each transcapacitive measurement is a pixel of a "capacitive image" and multiple transcapacitive measurements can be utilized to form a capacitive image of the object.

Herein sensor design and sensing scheme embodiments are described that allow the creation of 2-D capacitance images using a single sensing layer in which all of the transmitting and receiving sensor electrodes are disposed in a single common layer with one another without the use of jumpers within the sensor area. The electronics to drive the sensor are located in a processing system, such as processing system 110 described herein. These described embodiments also facilitate contact sensing, proximity sensing, and position sensing. These described embodiments also facilitate "multi-touch" sensing, such as two finger rotation gestures and two finger pinch gestures, but with a less expensive sensor compared to a sensor that utilizes sensor electrodes in multiple layers. The reduced number of layers used to form the input device described herein versus other conventional position sensing devices also equates to fewer production steps, which in itself will reduce the production cost of the device. The reduction in the layers of the input device also decreases interference or obscuration of an image or display that is viewed through the sensor, thus lending itself to improved optical quality of the formed input device when it is integrated with a display device. Additional electrodes involved in sensing the shape of the electric fields of the transmitters and receivers, such as floating electrodes or shielding electrodes, may be included in the device and may be placed on other substrates or layers. The electrodes may be part of a display (share a substrate) and may even share functionality with the display (used for both display and sensing functionality). For example electrodes may be patterned in the Color filter of an LCD (Liquid Crystal Display) or on the sealing layer of an OLED (Organic Light Emitting Diode) display. Alternately, sensing electrodes within the display or on TFT (Thin Film Transistor) layer of an active matrix display may also be used as gate or source drivers. Such electrodes may be patterned (e.g. spaced or oriented at an angle relative to the pixels) such that they minimize any visual artifacts. Furthermore, they may use hiding layers (e.g. Black Mask between pixels) to hide at least some portion of one or more conductive electrodes.

Figure 2A:
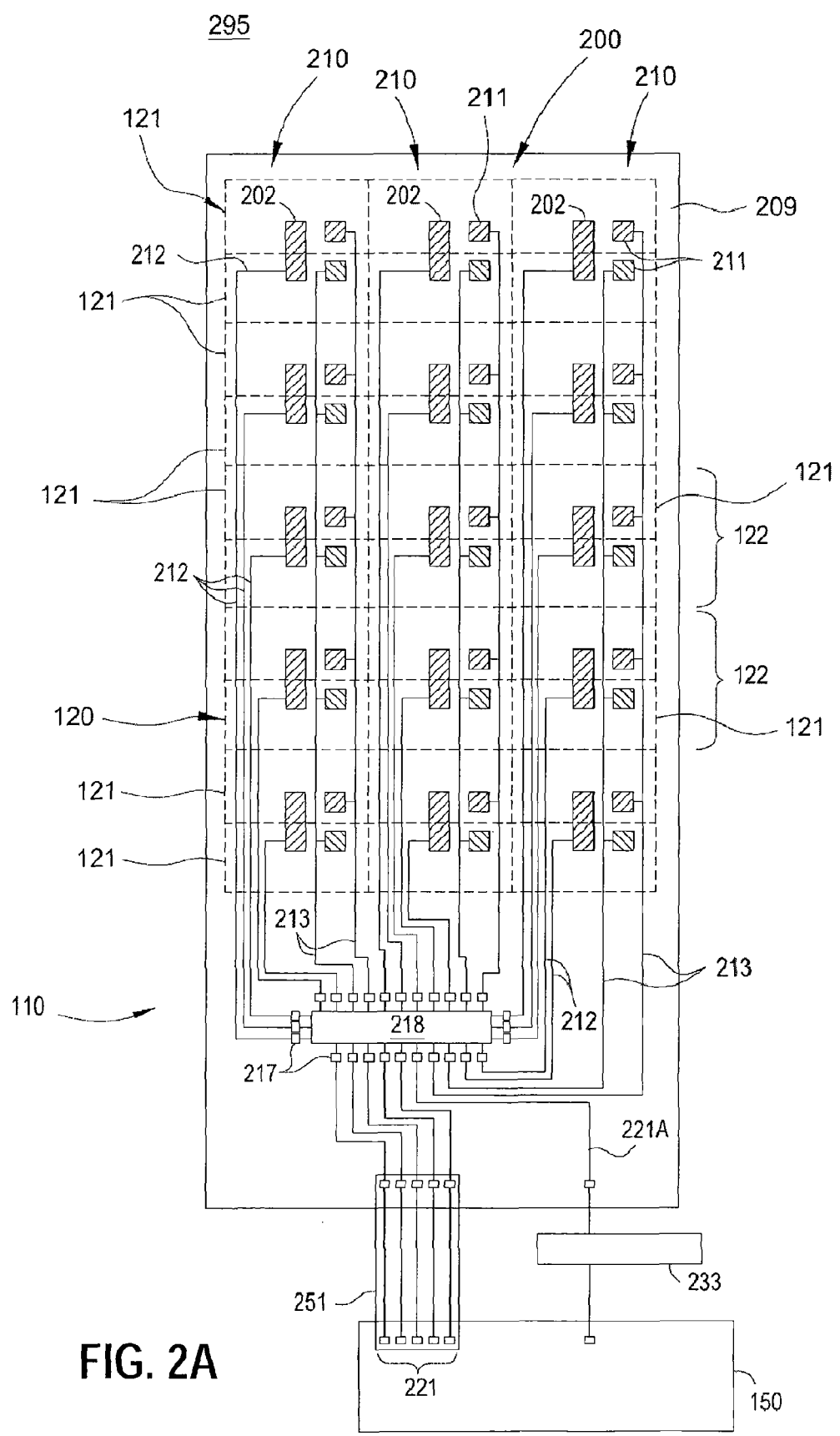
FIG. 2A is a schematic diagram illustrating an input device, according to one or more of the embodiments described herein.

FIG. 2A is a schematic top view of a portion of an input device 295 that illustrates a portion of a sensor electrode pattern that may be used to sense the positional information of an input object within the sensing region 120 using a transcapacitive sensing method. One will note that the input device 295 may be formed as part of a larger input device 100, which is discussed above. In general, the sensor electrode pattern disclosed herein comprises a sensor array set 200 that includes a plurality of sensor electrode arrays 210 that include a plurality of sensor electrodes, such as sensor electrodes 202 and 211, that are arranged and interconnected in a desirable manner to reduce or minimize the number of traces and/or sensor electrodes required to sense the positional information of an input object within the sensing region 120 of the input device 295. For clarity of illustration and description, while FIG. 2A illustrates a pattern of simple rectangles used to represent the sensor electrodes, this configuration is not meant to be limiting and in other embodiments, various other sensor electrode shapes may be used as discussed further herein. In other some embodiments, sensing elements 121 comprise two or more sensor electrodes, for example, sensor electrodes 202 and 211 that may be similar or different in size and/or shape. In one example, as shown, these sensor electrodes are disposed in a sensor electrode pattern that comprises a first plurality of sensor electrodes 202 (e.g., 15 shown) and a second plurality of sensor electrodes 211 (e.g., 30 shown), which are disposed on the same layer as the first plurality of sensor electrodes 202. Sensor electrodes 202 and sensor electrodes 211 are typically ohmically isolated from each other, by use of insulating materials or a physical gap formed between the electrodes to prevent them from electrically shorting to each other. In some configurations, two or more sensing elements 121 may form a larger unit cell 122. A unit cell 122 includes a grouping of sensor electrodes that are repeated within a sensor electrode array 210 and/or in a repeating pattern across the sensing region 120 (e.g., multiple sensor electrode arrays 210). The unit cell 122 is the smallest unit a symmetric grouping of sensor electrodes can be broken into within an electrode pattern formed across the sensing region 120. As illustrated in FIG. 2A, in one example, the unit cell 122 includes two sensing elements 121, which each contain a portion of the sensor electrode 202 and the sensor electrode 211, and thus the unit cell 122 comprises a sensor electrode 202 and two sensor electrodes 211. One will note that the sensor electrode pattern of FIG. 2A may alternatively utilize various sensing techniques, such as mutual capacitive sensing, absolute capacitive sensing, elastic, resistive, inductive, magnetic acoustic, ultrasonic, or other useful sensing techniques, without deviating from the scope of the invention described herein. Sensor electrode 202 maybe be a transmitter and 211 maybe a receiver, or vice versa (the other way around) with typically similar imaging capability.

In one embodiment, as illustrated in FIG. 2A, the sensing elements 121 may comprise a plurality of transmitter and receiver electrodes that are formed in a single layer on a surface of a substrate 209. In one configuration of the input device 295, each of the sensor electrodes may comprise one or more transmitter electrodes (e.g. sensor electrodes 202)

that are disposed proximate to one or more receiver electrodes (e.g. sensor electrodes 211). In one example, a transcapacitive sensing method using the single layer sensor electrode design, may operate by detecting the change in capacitive coupling between one or more of the driven transmitter sensor electrodes and one or more of the receiver electrodes, as similarly discussed above. In such embodiments, the transmitter and receiver electrodes may be disposed in such a way such that jumpers and/or extra layers used to form the area of capacitive pixels are not required. In various embodiments, the transmitter electrodes and receiver electrodes may be formed in an array on the surface of a substrate 209 by first forming a blanket conductive layer on the surface of the substrate 209 and then performing an etching and/or patterning process (e.g., lithography and wet etch, laser ablation, etc.) that ohmically isolates each of the transmitter electrodes and receiver electrodes from each other. In other embodiments, the sensor electrodes may be patterned using deposition and screen printing methods. As illustrated in FIG. 2A, these sensor electrodes may be disposed in an array that comprises a rectangular pattern of sensing elements 121, which may comprise one or more transmitter electrodes and one or more receiver electrodes. In one example, the blanket conductive layer used to form the transmitter electrodes and receiver electrodes comprises a thin metal layer (e.g., copper, aluminum, etc.) or a thin transparent conductive oxide layer (e.g., ATO, ITO, Zinc oxide) that is deposited using convention deposition techniques known in the art (e.g., PVD, CVD). In various embodiments, patterned isolated conductive electrodes (e.g., electrically floating electrodes) may be used to improve visual appearance. In one or more of the embodiments described herein, the sensor electrodes are formed from a material that is substantially optically clear, and thus, in some configurations, can be disposed between a display device and the input device user.

The areas of localized capacitive coupling formed between at least a portion of one or more sensor electrodes 202 and at least a portion of one or more sensor electrodes 211 may be termed a "capacitive pixel," or also referred to herein as the sensing element 121. For example, as shown in FIG. 2A, the capacitive coupling in a sensing element 121 may be created by the electric field formed between at least a portion of the sensor electrodes 202 and a sensor electrode 211, which changes as the proximity and motion of input objects across the sensing region changes.

In some embodiments, the sensing elements 121 are "scanned" to determine these capacitive couplings. The input device 295 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. In one example, the transmitter electrodes are the sensor electrodes 202 and the receiver electrodes are the sensor electrodes 211. For example, in one configuration, multiple sensor electrodes 202 transmit different transmitter signals according to one or more coding schemes that enable their combined effects on the resulting signals received by the receiving sensor electrodes, or sensor electrodes 211, to be independently determined. The direct effect of a user input which is coupled to the device may affect (e.g. reduce the fringing coupling) of the resulting signals. Alternately, a floating electrode may be coupled to the input and to the transmitter and receiver and the user input may lower its impedance to system ground and thus reduce the resulting signals. In a further example, a floating electrode may be displaced toward the transmitter and receiver which increases their relative coupling. The receiver electrodes, or a corresponding sensor electrode 211, may be operated singly or multiply to acquire resulting signals created from the transmitter signal. The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. In various embodiments, the sensing image, or capacitive image, comprises data received during a process of measuring the resulting signals received with at least a portion of the sensing elements 121 distributed across the sensing region 120. In one example, a capacitive image, or sensing image, comprises data received during a process of measuring the resulting signals received across all of the sensing elements 121 during a single scan cycle of the sensing region 120. The resulting signals may be received at one instant in time, or by scanning the rows and/or columns of sensing elements distributed across the sensing region 120 in a raster scanning pattern (e.g., serially polling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the sensing elements 121 are disposed on a substrate of an associated display device. For example, the sensor electrodes 202 and/or the sensor electrodes 211 may be disposed on a polarizer, a color filter substrate, or a glass sheet of an LCD. As a specific example, the sensor electrodes 202 and 211 may be disposed on a TFT (Thin Film Transistor) substrate of an LCD type of the display device, a color filter substrate, on a protection material disposed over the LCD glass sheet, on a lens glass (or window), and the like. The electrodes may be separate from and in addition to the display electrodes, or shared in functionality with the display electrodes. Similarly, an extra layer may be added to a display substrate or an additional process such as patterning applied to an existing layer.

In some touchpad embodiments, the sensing elements 121 are disposed on a substrate of a touchpad. In such an embodiment, the sensor electrodes in each sensing element 121 and/or the substrate may be substantially opaque. In some embodiments, the substrate and/or the sensor electrodes of the sensing elements 121 may comprise a substantially transparent material.

In those embodiments, where sensor electrodes of each of the sensing elements 121 are disposed on a substrate within the display device (e.g., color filter glass, TFT glass, etc.), the sensor electrodes may be comprised of a substantially transparent material (e.g., ATO, ClearOhm™) or they may be comprised of an opaque material and aligned with the pixels of the display device. Electrodes may be considered substantially transparent in a display device if their reflection (and/or absorption) of light impinging on the display is such that human visual acuity is not disturbed by their presence. This may be achieved by matching indexes of refraction, making opaque lines narrower, reducing fill percentage or making the percentage of material more uniform, reducing spatial patterns (e.g. moire') that are with human visible perception, and the like.

In one configuration, as illustrated in FIG. 2A and further discussed below, the processing system 110 of the input device 295 comprises a sensor controller 218 that is coupled through connectors 217 to each of the transmitter and receiver electrodes, such as sensor electrodes 202 and 211, through one or more traces (e.g., traces 212 and 213), respectively. In one embodiment, the sensor controller 218 is generally configured to transmit the transmitter signal and receive the resulting signals from receiver electrodes. The sensor controller 218 is also generally configured to communicate the positional information received by the sensing elements 121 to the electronic system 150 and/or the display controller 233, which is also coupled to the electronic system 150. The sensor controller 218 may be coupled to the electronic system 150 using one or more traces 221 that may pass through a flexible element 251 and be coupled to the display controller 233 using one or more traces 221A that may pass through the same flexible element 251 or a different connecting element, as shown. While the processing system 110 illustrated in FIG. 2A schematically illustrates a single component (e.g., IC device) to form the sensor controller 218, the sensor controller 218 may comprise two or more controlling elements (e.g., IC devices) to control the various components in the processing system 110 of the input device 295. The controller devices may be placed onto display substrates such as TFT or Color Filter/Sealing layers (e.g. as a Chip On Glass).

In one configuration, the functions of the sensor controller 218 and the display controller 233 may be implemented in one integrated circuit that can control the display module elements and drive and/or sense data delivered to and/or received from the sensor electrodes. In various embodiments, calculation and interpretation of the measurement of the resulting signals may take place within the sensor controller 218, display controller 233, a host electronic system 150, or some combination of the above. In some configurations, the processing system 110 may comprise a transmitter circuitry, receiver circuitry, and memory that is disposed within one or any number of ICs found in the processing system 110, depending to the desired system architecture.

Figure 2B:
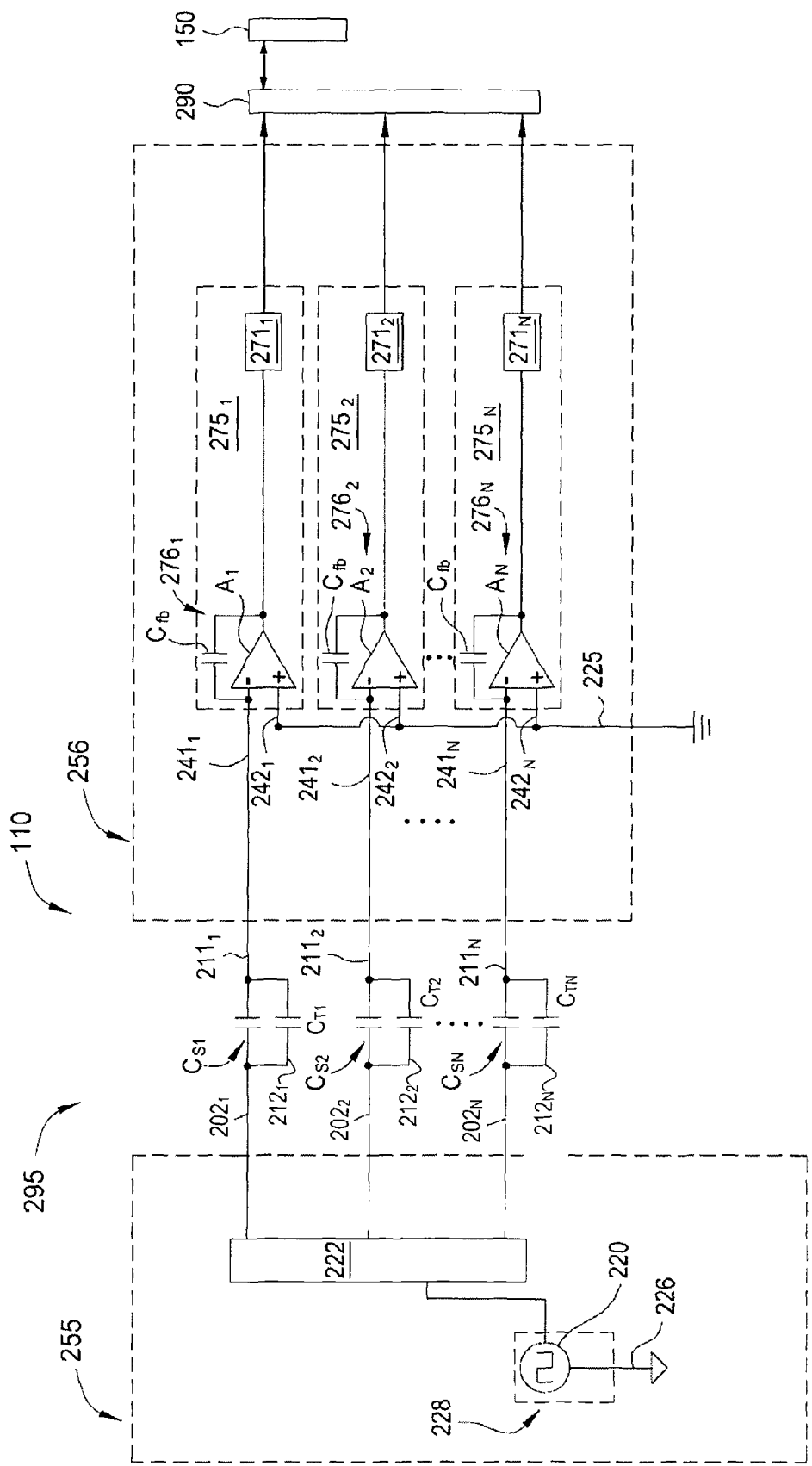
FIG. 2B is a schematic diagram illustrating a portion of an input device, according to one or more of the embodiments described herein.

FIG. 2B is a schematic view of a portion of the processing system 110 of the input device 295 according to one or more of the embodiments described herein. In one configuration, the sensor controller 218 includes a signal generating processor 255 and sensor processor 256 that work together to provide touch sensing data to an analysis module 290 and the electronic system 150. The analysis module 290 may be part of the processing system 110, the sensor processor 256 and/or part of the electronic system 150. In various embodiments, the analysis module 290 will comprises digital signal processing elements and/or other useful digital and analog circuit elements that are connected together to process the receiver channel output signal(s) received from at least one receiver channel that is coupled to a receiver electrode, and also provide processed signals to other portions of the electronic system 150. The electronic system 150 can then use the processed signals to control some aspect of the input device 295, such as send a message to the display, perform some calculation or software related task based on instructions created by one or more software programs that are being run by the electronic system and/or perform some other function.

As illustrated in FIG. 2B, the processing system 110 may comprise a signal generating processor 255 and a sensor processor 256 that work together to provide receiver channel output signals to the analysis module 290 and/or the electronic system 150. As discussed above, the positional information of an input object 140 (FIG. 1) is derived based on the capacitance $C_S$ (e.g., capacitance $C_{S1}, C_{S2}, \ldots C_{SN}$) measured between each of the transmitter electrodes (e.g., sensor electrodes $202_1, 202_2, \ldots 202_N$) and the receiver electrodes (e.g., sensor electrodes $211_1, 211_2, \ldots 211_N$), wherein N is a positive integer.

Each of the transmitter electrodes (e.g., sensor electrodes $202_1, 202_2, \ldots 202_N$) is connected to a trace (e.g., traces $212_1, 212_2, \ldots 212_N$). Each trace has a certain amount of capacitance (e.g., transcapacitance) that is formed between the trace and the corresponding receiver electrode. As illustrated in FIG. 2B, the capacitance between a trace and a receiver is given by capacitance $C_T$ (e.g., capacitance $C_{T1}, C_{T2}, \ldots C_{TN}$) and can be measured between each of the trace (e.g., traces $212_1, 212_2, \ldots 212_N$) and a receiver electrode (e.g., $211_1, 211_2, \ldots 211_N$) at various points along the trace (e.g., Y-direction in FIG. 2C), where N is a positive integer. As shown, each trace capacitance $C_T$ (e.g., capacitance $C_{T1}, C_{T2}, \ldots C_{TN}$) is in parallel with a transmitter capacitance $C_S$ (e.g., capacitance $C_{S1}, C_{S2}, \ldots C_{SN}$). Parasitic capacitance occurs where an input object is positioned over a trace and the input device detects a change in the capacitance at an associated pixel (e.g., sensed resulting signal provided by the associated sensing element 121), due to the change in the trace capacitance $C_T$ (e.g., capacitance $C_{T1}, C_{T2}, \ldots C_{TN}$). Such parasitic capacitance is an issue that the present technology disclosed herein is configured to address.

In one embodiment, as shown in FIG. 2B, the signal generating processor 255 comprises a driver 228, which are adapted to deliver capacitive sensing signals (transmitter signals) to the transmitter electrodes. In one configuration, the driver 228 may comprise a power supply and signal generator 220 that is configured to deliver a square, rectangular, trapezoidal, sinusoidal, Gaussian or other shaped waveforms used to form the transmitter signal(s) to the transmitter electrodes. In one configuration, the signal generator 220 comprises an electrical device, or simple switch, that is able to deliver a transmitter signal that transitions between the output level of the power supply and a low display voltage level. In various embodiments, signal generator 220 may comprise an oscillator. In some configurations, the signal generator 220 is integrated into the driver 222, which includes one or more shift registers (not shown) and/or switches (not shown) that are adapted to sequentially deliver transmitter signals to one or more of the transmitter electrodes at a time.

In one embodiment, as shown in FIG. 2B, the sensor processor 256 comprises a plurality of receiver channels 275 (e.g., receiver channels $275_1, 275_2, \ldots 275_N$) that each have a first input port 241 (e.g., ports $241_1, 241_2, \ldots 241_N$) that is configured to receive the resulting signal received with at least one receiver electrode (e.g., sensor electrode $211_1, 211_2, \ldots 211_N$), a second input port (e.g., ports $242_1, 242_2, \ldots 242_N$) that is configured to receive a reference signal delivered through the line 225, and an output port coupled to the analysis module 290 and electronic system 150. Typically, each receiver channel 275 is coupled to a single receiver electrode. Each of the plurality of receiver channels 275 may include a charge accumulator 276 (e.g., charge accumulators $276_1, 276_2, \ldots 276_N$), supporting components 271 (e.g., components $271_1, 271_2, \ldots 271_N$) such as demodulator circuitry, a low pass filter, sample and hold circuitry, other useful electronic components filters and analog/digital converters (ADCs) or the like. The analog/ digital converter (ADC) may comprise, for example, a standard 8, 12 or 16 bit ADC that is adapted to receive an analog signal and deliver a digital signal (receiver channel output signal) to the analysis module 290 (e.g. a Successive Approximation ADC, a Sigma-Delta ADC, an Algorithmic ADC, etc). In one configuration, the charge accumulator 276 includes an integrator type operational amplifier (e.g., Op Amps $A_1$-$A_N$) that has an integrating capacitance $C_{fb}$ that is coupled between the inverting input and the output of the device. Due to the type of electronic elements required to detect and process the received resulting signals, the cost required to form the each receiver channel 275 is generally more expensive than the cost required to form the components in the signal generating processor 255 that provides the transmitter signal(s) to a transmitter electrode(s).

Figure 2C:
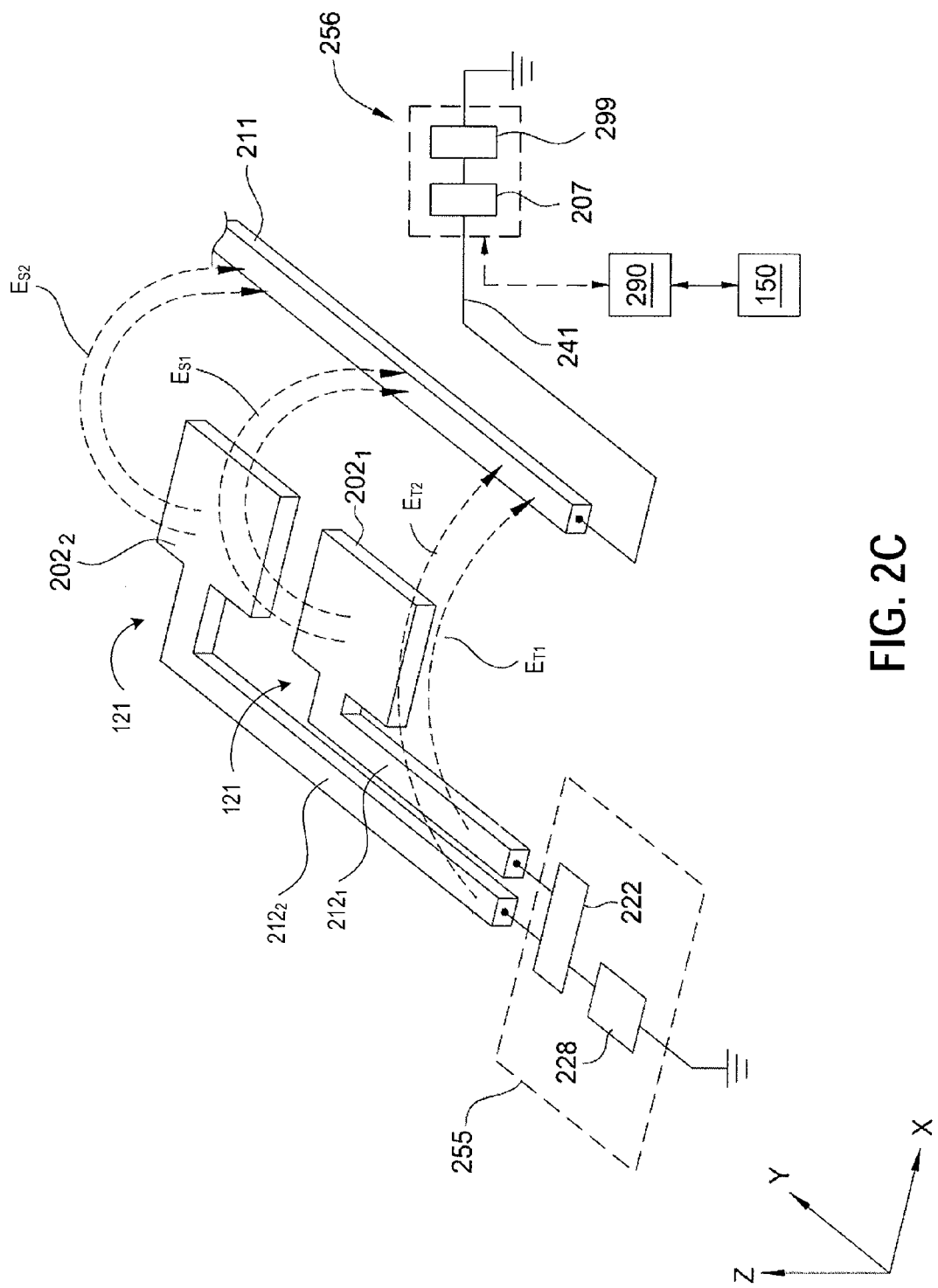
FIG. 2C is a schematic view of sensing elements disposed in an array of sensing elements (not shown) of the input device, according to one or more of the embodiments described herein.

FIG. 2C is a schematic view of sensing elements 121 disposed in an array of sensing elements (not shown) of the input device 100, which is part of the processing system 110 of an input device 295 according to one or more of the embodiments described herein. For simplicity, only two transmitter electrodes ($202_1$, $202_2$) are shown, and thus each of the two sensing elements 121 illustrated in FIG. 2C comprises a transmitter electrode $202_1$, $202_2$ and a portion of the receiver electrode 211. As illustrated in FIG. 2C, the receiver electrode 211 interacts with the two transmitter electrodes $202_1$, $202_2$ and two corresponding traces $212_1$, $212_2$ when a sensing signal is provided to each of the transmitter electrode in the each sensing element. The processing system 110 includes a signal generating processor 255 and a sensor processor 256 that work together to provide capacitive sensing receiver channel output signals to the analysis module 290 and electronic system 150. As discussed above, the processing system derives the positional information of an input object 140 (FIG. 1) based on the capacitance measured between each of the transmitter electrodes and the receiver electrodes contained in the sensing region 120. In various embodiments, the sensor processor 256 comprises digital signal processing elements and/or other useful digital and analog circuit elements that are connected together to process the receiver channel output signal(s) received from at least one receiver channel that is coupled to each of the receiver (Rx) electrodes 211. The electronic system 150 can then use the processed signals to control some aspect of the input device 295, such as send a message to the display, perform some calculation or software related task based on instructions created by one or more software programs that are being run by the electronic system and/or perform some other function.

In one embodiment, as shown in FIG. 2C, the signal generating processor 255 comprises a driver 228, which is adapted to sequentially deliver capacitive sensing signals (transmitter signals) to the transmitter (Tx) electrodes $202_1$, $202_2$ in the array of sensing elements. In one configuration, the driver 228 may comprise a power supply and signal generator that is configured to deliver a square, rectangular, trapezoidal, sinusoidal, Gaussian or other shaped waveforms used to form the transmitter signal(s) to the transmitter electrodes. In one configuration, the signal generator comprises an electrical device, or simple switch, that is able to deliver a transmitter signal that transitions between the output level of the power supply and a low display voltage level.

In one embodiment, as shown in FIG. 2C, the sensor processor 256 comprises a plurality of receiver channel(s) 207 that each have a first input port 241 that is configured to receive the resulting signal received by at least one receiver electrode 211, and an output port coupled to the analysis module 290. Typically, each receiver channel 207, which can be the same as a receiver channel 275 discussed above, may be coupled to a single receiver electrode 211. In one configuration, the sensor processor 256 further comprises an electromagnetic interference (EMI) filter 299 that is adapted to filter EMI induced by other input device components.

Traces $212_1$, $212_2$ connect the driver 222 to the transmitter electrodes $202_1$, $202_2$, respectively. For example, trace $212_1$ connects the driver 222 to transmitter electrode $202_1$ and trace $212_2$ connects the driver 222 to transmitter electrode $202_2$. The capacitance between trace $212_1$ and the receiver electrode 211 is associated with an electric field $E_{T1}$. The capacitance between trace $212_2$ and the receiver electrode 211 is associated with an electric field $E_{T2}$. The capacitance between transmitter electrode $202_1$ and the receiver electrode 211 is associated with an electric field $E_{S1}$. The capacitance between transmitter electrode $202_2$ and the receiver electrode 211 is associated with an electric field $E_{S2}$.

Where an input object (e.g., finger) is positioned near, such as over a transmitter electrode $202_1$, $202_2$ and receiver electrode 211, the associated trace will also see a change in capacitance (and corresponding electric field). For example, if an input object (e.g., finger) is over transmitter electrode $202_1$, the electric field $E_{S1}$ tends to change, along with the electric field $E_{T1}$ generated between trace $212_1$ and the receiver electrode 211. Likewise, if an input object (e.g., finger) is over transmitter electrode $E_{S1}$, the electric field $E_{S2}$ tends to change along with the electric field $E_{T2}$ generated between the trace $212_2$ and the receiver electrode 211.

Likewise, where an input object (e.g., finger) is near a trace $212_1$, $212_2$, when a sensing signal is provided a change in capacitance (and corresponding electric field) between the trace and the receiver electrode 211 will be measured by the sensor processor 256. The position of the input object near a trace $212_1$, $212_2$ will cause a change in the electric field generated between the trace and the receiver electrodes, and thus affect the measured resulting signal measured by the sensor processor 256. For example, if an input object (e.g., finger) is over trace $212_1$, the electric field $E_{T1}$ tends to change, which is seen as a change in the resulting signal delivered by the transmitter electrode $202_1$ to the receiver electrode 211. Likewise, if an input object (e.g., finger) is over trace $212_2$, the electric field $E_{T2}$ tends to change, which is seen as a change in the resulting signal delivered by the transmitter electrode $202_2$ to the receiver electrode 211. The capacitance changes at the traces $212_1$, $212_2$ also affect the capacitive coupling of the connected transmitter electrode(s) $202_1$, $202_2$ to the receiver electrode 211, respectively. Such capacitance changes associated with an input object (e.g., finger) being over a trace may be referred to as "parasitic capacitance." As further described below, the input device is configured to correct parasitic capacitance in order to carry out object detection algorithms more accurately.

Sensor Device Example(s)

FIGS. 3A-3E schematically illustrate an example of a sensor array set 300, according to one or more embodiments described herein. The sensor array set 300 is similar to the sensor array set 200 of FIG. 2A, but shows other components and a different arrangement of electrodes for explanatory purposes.

Figure 3A:
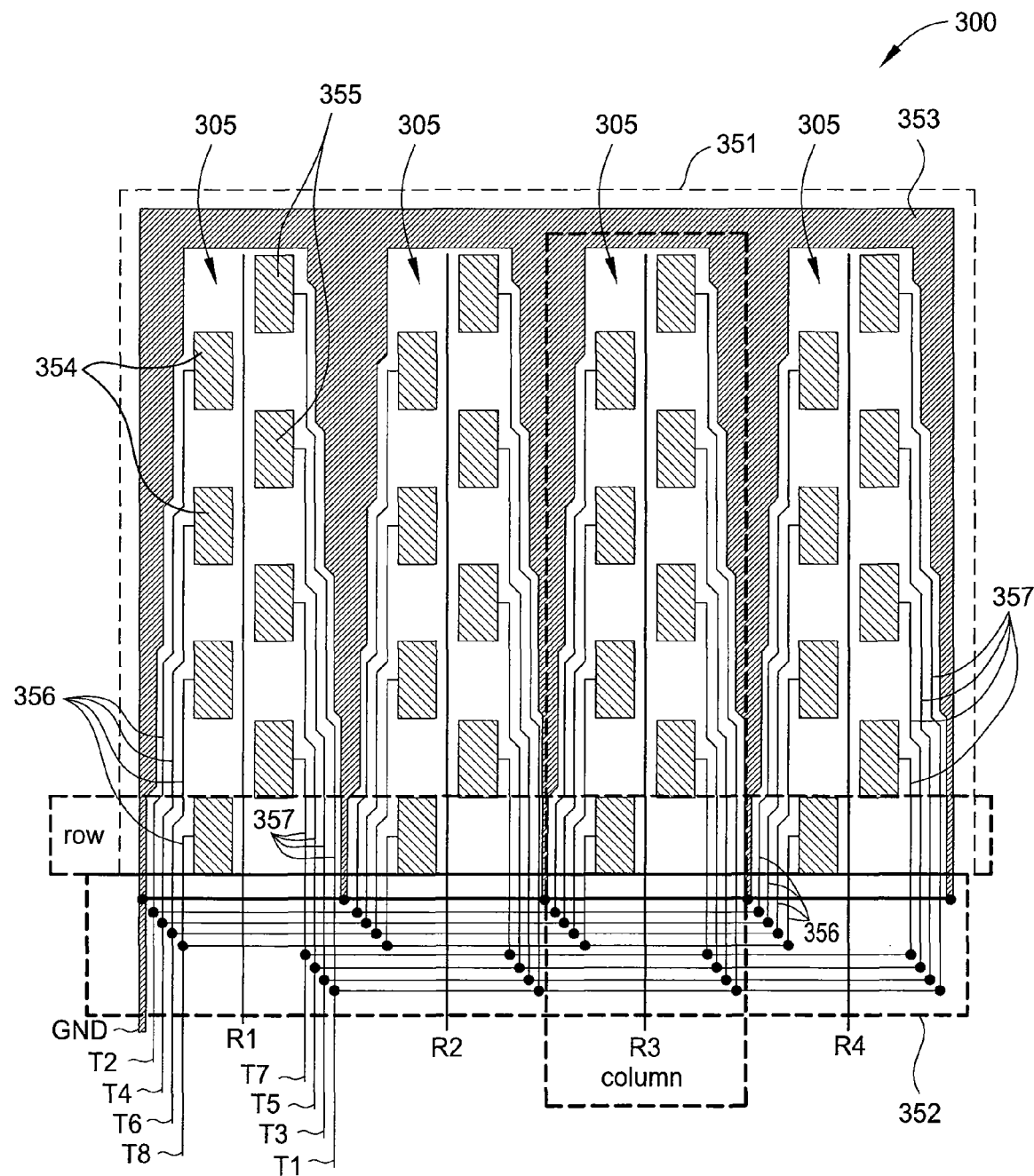
FIGS. 3A-3C schematically illustrate an example sensor array set 300, according to one or more embodiments described herein.

FIG. 3A shows the sensor array set 300 including two or more sensor electrode columns 371 and two or more sensor rows. In this example, each sensor electrode column 371 includes a receiver and transmitters. Each receiver, such as receiver R1, receiver R2, receiver R3 or receiver R4, is associated with a sensor electrode column 371. Transmitters 354 are disposed on a left side of each receiver. Transmitters 355 are disposed on a right side of each receiver. The four sensor electrode columns are disposed within a sensing region 351 to determine positional information of an input object by use of various components of the processing system 110, as described above.

The sensor array set 300 includes a shield electrode 353 and a trace routing scheme that enables the interconnection of the various traces and external components to be made outside of the sensing region 351. The shield electrode 353 shields the sensor receivers R1, R2, R3, R4, transmitters 354, 356, and associated conductive traces 356, 357. In FIG. 3A, the one or more components of the shield electrode 353 are coupled together in an external bonding area 352 and are also connected to a system ground GND and/or a chassis of the input device 100. FIG. 3A also shows neighboring groups of transmitters coupled to different interconnection traces in the external bonding area 352. Interconnection traces T2, T4, T6, and T8 are connected to traces 356. Interconnection traces T7, T5, T3, and T1 are connected to traces 357. In this manner, transmitters associated with neighboring receivers can transmit at different times or different polarities in order to reduce or detect total input coupling from the user input (e.g., finger touch) to those neighboring groups of transmitters.

Figure 3B:
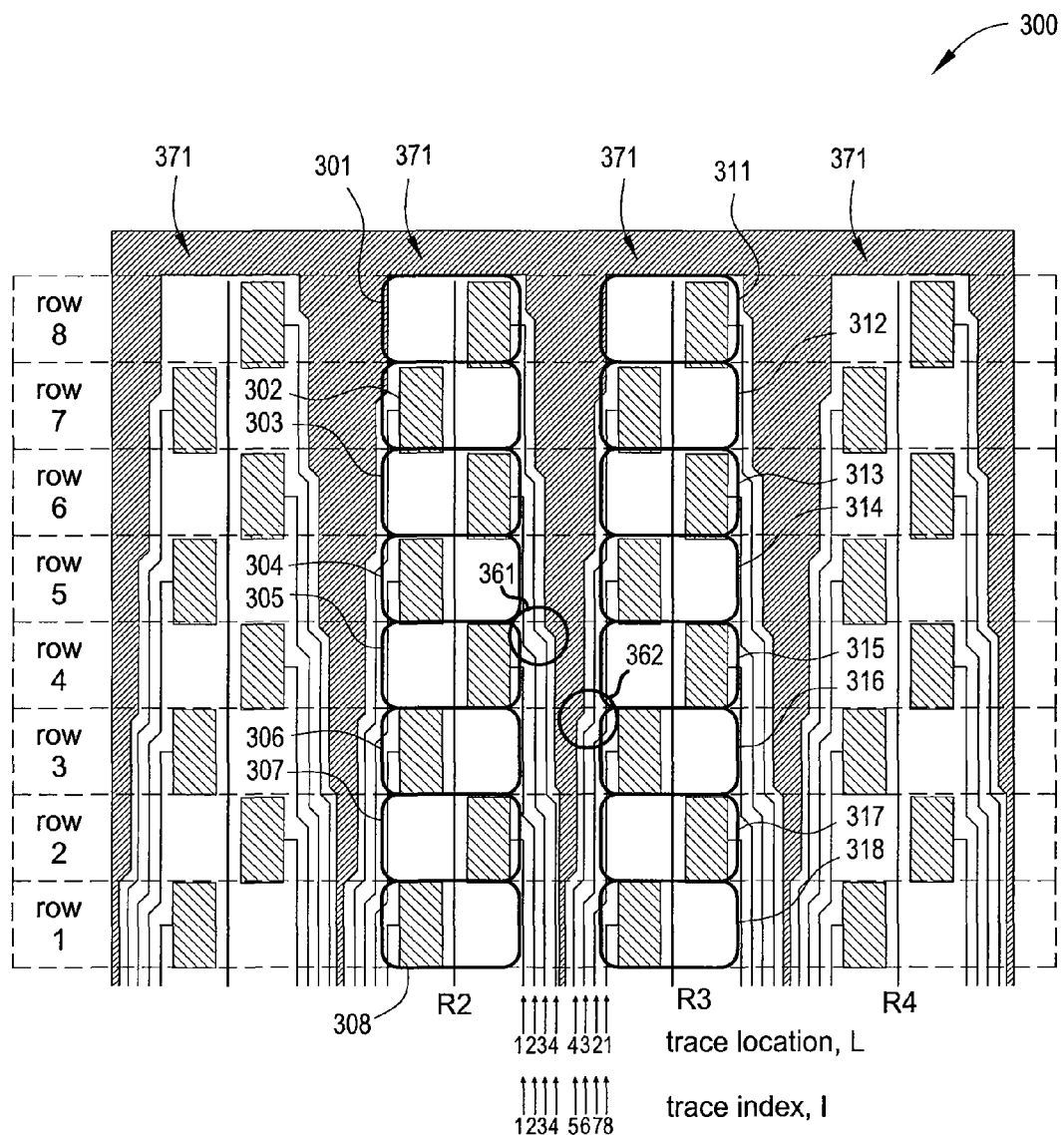

FIG. 3B illustrates the sensor array set 300 including pixels, rows, trace locations, and trace indices. As discussed above, a pixel includes a transmitter electrode and receiver electrode pair. Pixels that have transmitter electrodes on a right side of receiver electrode R2 include pixel 301, pixel 303, pixel 305 and pixel 307, and pixels that have transmitter electrodes on a left side of the receiver electrode R2 include pixel 302, pixel 304, pixel 306 and pixel 308. Pixels that have transmitter electrodes on a left side of receiver electrode R3 include pixel 312, pixel 314, pixel 316 and pixel 318, and pixels that have transmitter electrodes on a right side of the receiver electrode R3 include pixel 311, pixel 313, pixel 315 and pixel 317. Each pixel also includes at least part of one or more traces, which are described above with reference to FIG. 3A.

Each row includes a group of pixels that are arranged in a horizontal direction as shown in FIG. 3B. In general, a sensor array set may include any number of rows of pixels. The sensor array set 300 illustrated in FIG. 3B includes 8 rows of pixels. For example, row 8 includes at least pixels 301 and 311, row 7 includes at least pixels 302 and 312, row 6 includes at least pixels 303 and 313, row 5 includes at least pixels 304 and 314, row 4 includes at least pixels 305 and 315, row 3 includes at least pixels 306 and 316, row 2 includes at least pixels 307 and 317, and row 1 includes at least pixels 308 and 318.

In order to identify the position of a trace between or adjacent to one or more sensor electrode columns 371, a trace index is used. Thus, a trace index is used to define locations of traces near a sensor electrode column. In FIG. 3B, the trace indices are numbered from left to right. The trace indices include, from left to right, trace index 11 through trace index 18.

A trace location is a location of a trace relative to a boundary of a sensor electrode column. The trace locations are numbered from the trace closest to the receiver inward. The trace locations include a location L1 (closest to the receiver electrode R2) through a trace location L4 (furthest from receiver electrode R2). The trace locations also include a location L4 (farthest from receiver electrode R3) through location L1 (closest to receiver electrode R3).

Figure 3C:
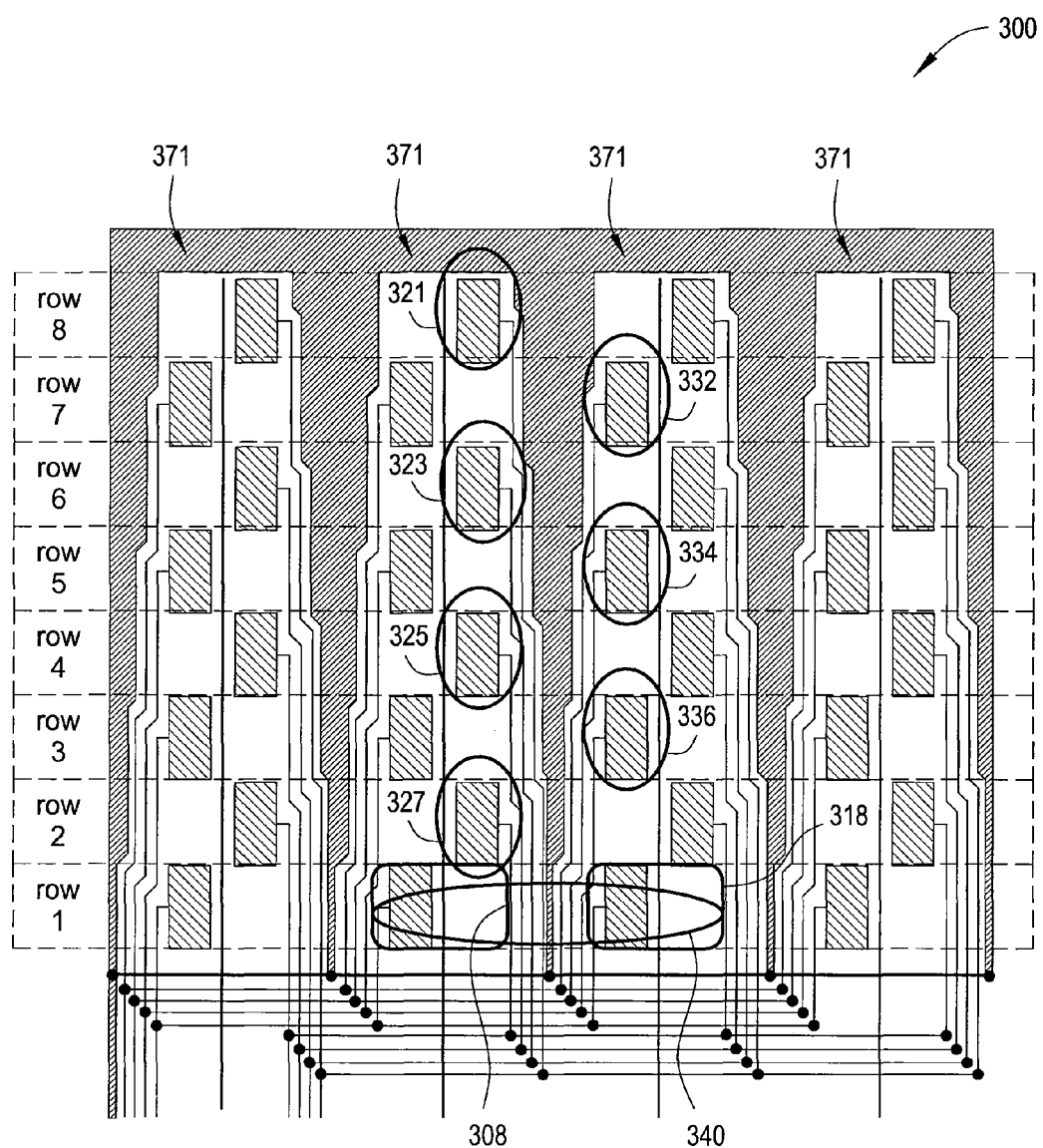

FIG. 3C illustrates the sensor array set 300 including a finger location 340 and parasitic response locations. For simplicity, some elements described above are excluded from FIG. 3C but are relied upon for describing FIG. 3C. In FIGS. 3B and 3C, the finger location 340 covers at least a portion of pixel 308 and at least a portion of pixel 318. When the sensor array set 300 measures the change in capacitance due to the presence of a finger over at least one pixel in the sensor array set 300, the processing system 110 interprets the input as occurring at pixel 308 and pixel 318. As described above with reference to FIG. 2C, because the finger location 340 also covers some traces, the sensor array set also detects some parasitic capacitances. The parasitic capacitances cause the input device to detect some responses at other the pixel locations associated with the input object (e.g., finger).

As described above with reference FIG. 3B, a space around a pixel may also include at least a portion of one or more traces. Accordingly, the finger location 340 covers multiple traces in addition to the covered transmitters and receiver in the pixel. As shown in FIGS. 3B and 3C, the transmitters of the pixels 301, 303, 305, 307, 312, 314, 316, and 318 are coupled to traces that pass under the finger location 340. A coverage of a trace alters the capacitance between the trace and the associated receiver. As described above, the altered capacitance causes an unwanted parasitic response, such as a parasitic response measured at location 321, a parasitic response measured at location 323, a parasitic response measured at location 325, a parasitic response measured at location 327, a parasitic response measured at location 332, a parasitic response measured at location 334, and a parasitic response measured at location 336. For example, the input device 100, incorrectly identifies some input as being received at pixels 301, 303, 305, 307, 312, 314, 316 and 318, when the input object interferes with the sensing signal delivered through the traces coupled to each of the transmitters (Tx) in the pixels 301, 303, 305, 307, 312, 314, 316 and 318. Further, in the example of FIG. 3B, traces in the columns of transmitters in the sensor electrode columns 371 (e.g., two columns of transmitters shown in each sensor electrode columns 371) alternate from left to right. Accordingly, such alternating may need to be taken into account when calculating and correcting parasitic response. In general, the corrected parasitic response process(es) described herein can be useful to resolve detected parasitic responses for any trace layout within the sensing region, and also any trace configurations in which the traces exit the sensing region from one or more sides of the sensing region (e.g., traces exit the sensing region from the bottom side or both the top and bottom sides of the sensing region).

Parasitic response can cause the input device 100 to interpret the actual position of one or more input objects incorrectly and/or has a negative effect on algorithms running in the processing system 110 for determining the location of one or more input objects. If parasitic response is too high, the input device may incorrectly calculate the location of a finger as being at a location the finger actually is not.

Example Parasitic Response

Figure 4A:
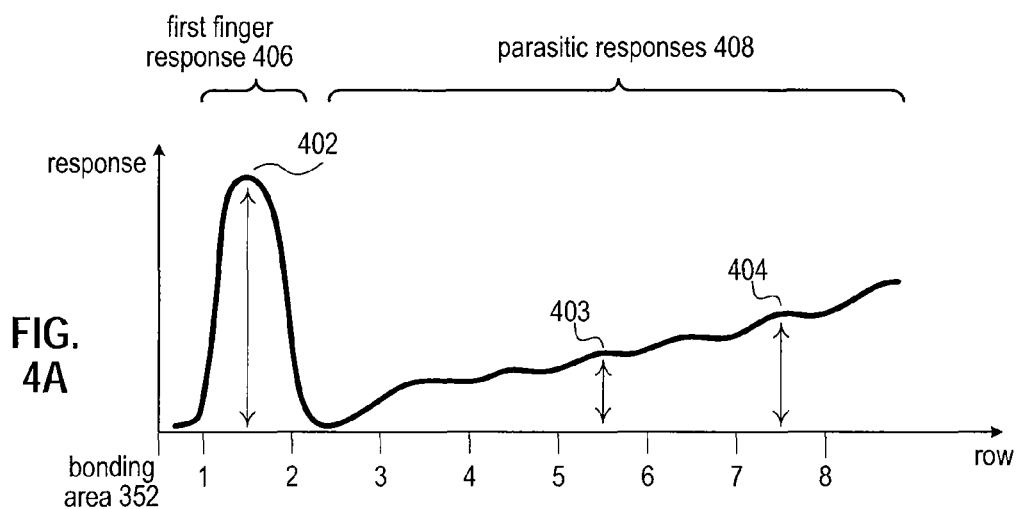
FIGS. 4A-4C are example graphs of responses associated with the sensor array set 300 of FIGS. 3A-3C, according to one or more embodiments described herein.
Figure 4B:
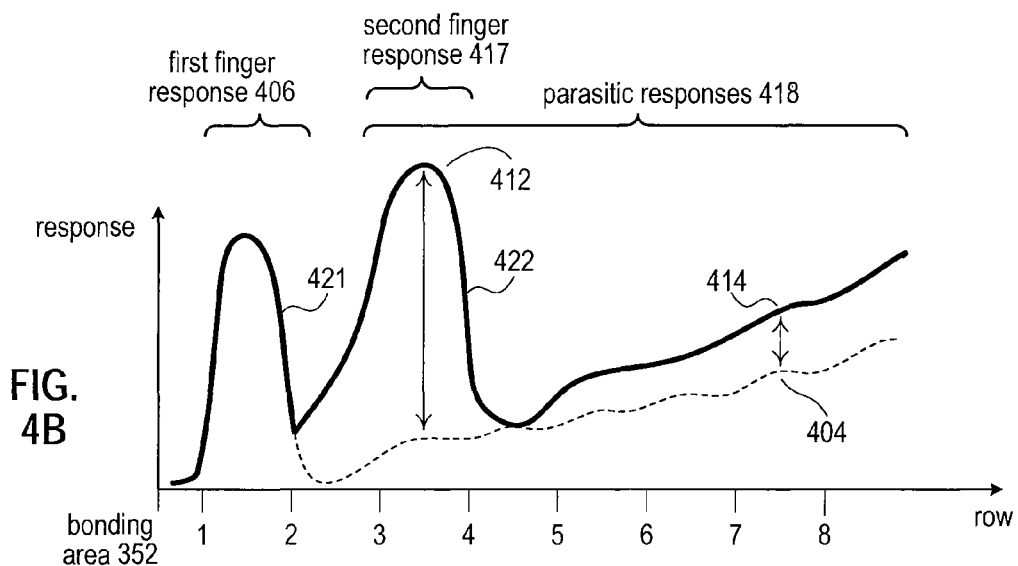
Figure 4C:
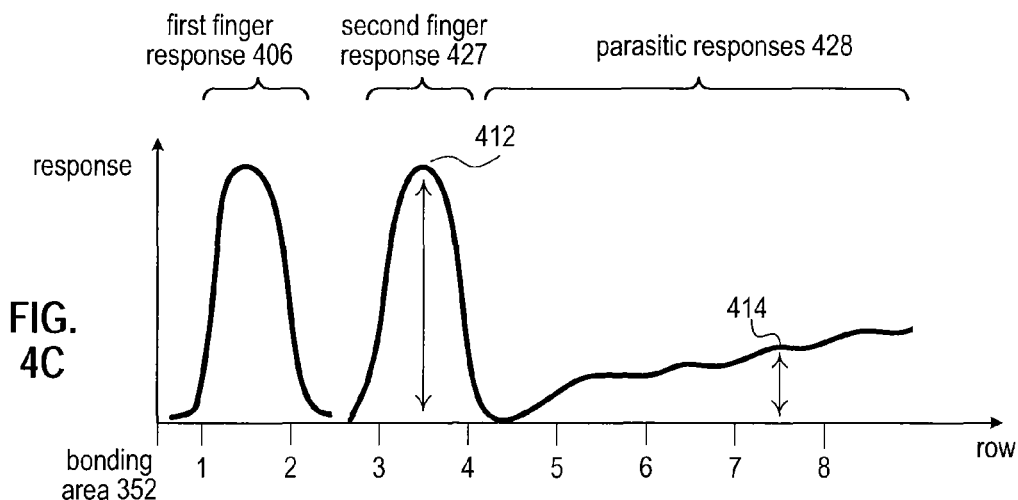

FIGS. 4A-4C are example graphs of responses associated with the sensor array set 300 of FIGS. 3A-3C, according to one or more embodiments described herein. In detecting response on the sensor array set 300, the input device 100 first generates a sensing image (or capacitive image) of the sensor array set 300, which is discussed above. In one example, to obtain the sensing image, the input device 100 scans the sensor array set 300, starting from the top and progressing towards the bonding area (e.g., moving downwards), as described above with reference to FIGS. 2A-2C. For instance, referring to FIG. 3B, the input device 100 can sequentially scan from row 8 to row 1 to obtain the sensing image. In another example, to obtain the sensing image, the input device 100 can sequentially scan from row 1 to row 8 to obtain the sensing image.

FIG. 4A is a graph of the resulting signal (or sensor response) versus the position of the rows of pixels disposed in one or more sensor electrode columns 371 in the sensing region 120 (e.g., corresponding to a distance from the bonding area 352). The graph includes a first finger response 406 and an associated parasitic response 408. For example, a first finger is covering a first pixel of the sensor electrode column 371 of the sensor array set 300 (shown in FIG. 3C). In this example, the first finger response 406 has a magnitude 402 at a pixel that is relatively close to the bonding area 352. One will note that the parasitic response 408 tends to increase when a pixel is positioned farther away from the bonding area 352, because a width of a trace that is used to connect an electrode in a pixel that is positioned a distance from the bonding area tends to be wider to compensate for RC losses created by the extra distance the various signals need to travel through the longer trace. Finger input disposed over a wider trace causes capacitance to decrease more due to the surface area of the trace and thereby causes a greater parasitic response. Also, the position of the trace relative to the receiver electrode will affect the parasitic response. In one example, a trace in the L4 location is closer to the receiver electrode R3 in the third column than the trace in the L2 location. For example, as shown in FIG. 4A, a magnitude 404 is greater than a magnitude 403 because the magnitude 404 is associated with a pixel that is farther away from the bonding area 352 (e.g., pixels in rows 7 or 8 versus rows 5 or 6).

FIG. 4B is another graph of the resulting signal (or sensor response) versus the position of the rows of pixels disposed in one or more sensor electrode columns 371 of the sensing region 120, where the input device 100 receives input from a first finger (e.g., curve 421) and a second finger (e.g., curve 422). The graph includes the first finger response 406, a second finger response 417, and parasitic response 418. For example, the first finger is covering the first pixel of the sensor array set 300, while the second finger is covering a second pixel in a different row of the sensor array set 300. The second finger response has a magnitude 412 at a pixel that is relatively close to the bonding area 352 but farther than the pixel associated with the first finger response 406. One will note that the sensing image of the received resulting signal will follow curve 422, or sum of the finger responses and parasitic responses, however, for clarity of discussion both resulting signals (e.g., first finger response and second finger response) are shown in FIG. 4B. For explanatory purposes, the first finger covers most of the same traces that the second finger covers. As shown in FIG. 4B, if parasitic response is not corrected, the input device adds measured resulting signal response associated with the second finger to the parasitic response associated the first finger. For example, the input device adds the magnitude 412 to the parasitic response associated with the first finger. Likewise, the input device adds a parasitic response magnitude 414 to the parasitic response magnitude 404 associated with the first finger. However, as further explained below, the input device 100 is configured to correct (e.g., remove) measured parasitic response and thereby improve accuracy of finger locating algorithms.

FIG. 4C is yet another graph of the resulting signal (or sensor response) versus the position of the rows of pixels disposed in one or more sensor electrode columns 371 of the sensing region 120, where the input device 100 has corrected (e.g., removed) the parasitic response created by the position of the first finger over the traces associated with the other rows in the one or more sensor electrode columns 371 of the sensor array set 300. As shown, the second finger response 427 is more accurate because the input device does not add the magnitude 412 to the parasitic response associated with the first finger at rows 3 and 4. Likewise, the parasitic response 428 only includes the parasitic response associated with the second finger and does not include the parasitic response associated with the first finger. For example, the input device does not add the magnitude 414 to the parasitic response magnitude 404 associated with the first finger. The input device 100 may continue recursively in this manner to remove the parasitic response 428 associated with the second finger. The input device 100 may also continue recursively in this manner to remove parasitic response associated with other finger inputs. The next section describes a technique for estimating and correcting the type of parasitic response that is described above with reference to FIGS. 4A-4C.

Correcting Parasitic Response

As noted above, parasitic response has a negative effect on an algorithm for determining the actual position of a finger over the sensing region 120. In some embodiments, the input device 100 includes a filter that removes parasitic response before the input device carries out the finger location algorithm. Accordingly, the algorithm receives cleaner input for determining the finger location. Without the filter, any algorithm operating on a parasitic capacitance affected sensing image has the potential of not working as expected while a finger is covering the sensor array set 300, because a parasitic response that is too large may cause the input device to misinterpret a finger as being positioned where the finger is not actually positioned. One will appreciate that other sensor electrode configurations can also benefit from the techniques described herein, for example, the sensor electrode configuration illustrated in FIG. 2A may also benefit from the techniques described herein. Before the input device 100 can correct parasitic response, the input device 100 needs to estimate the parasitic response associated with an input object being disposed at a particular sensed position within the sensing region 120.

Figure 5A:
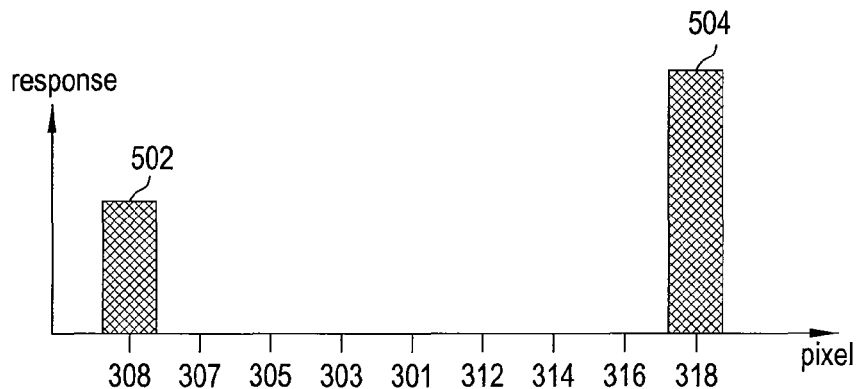
FIGS. 5A-5C are graphs that illustrate operations for estimating parasitic response, according to one or more embodiments described herein.
Figure 5B:
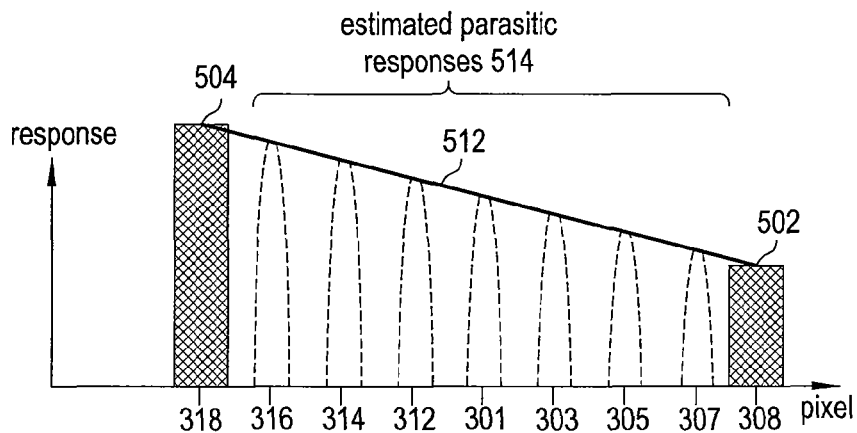
Figure 5C:
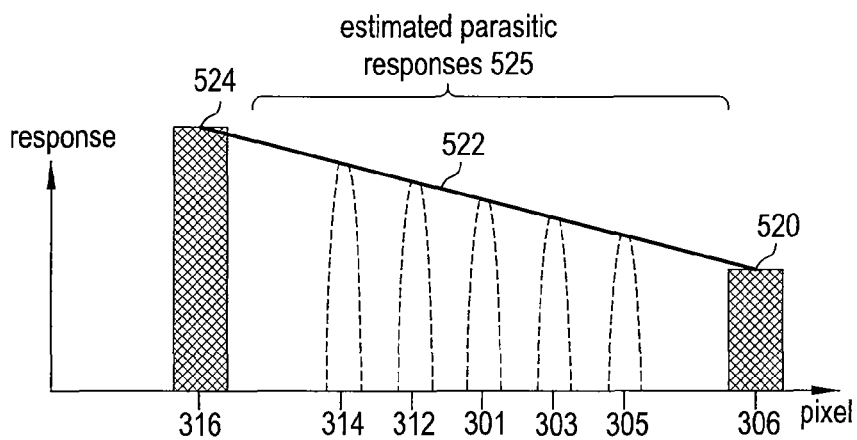

FIGS. 5A-5C are graphs that illustrate an operation for estimating parasitic response, according to one or more embodiments described herein. For explanatory purposes, the graphs are associated with the sensor array set 300 of FIGS. 3A-3C, and the abscissa in the graphs is aligned parallel to a row and the ordinate is a measure of the magnitude of the resulting signal response.

FIG. 5A is a graph illustrating the resulting signal response received due to the presence of an input object (e.g., finger) at the finger location 340, shown in FIG. 3C, and does not show the presence of any parasitic responses related to the presence of the input object associated with finger location 340. In this example, due to the position of finger location 340 within the sensing region 120, the pixel 308 has a pixel response 502, and the pixel 318 has a pixel response 504. As shown in FIG. 3C, the finger location 340 is covering pixel 318 more than pixel 308, and thus the pixel response 504 is greater than pixel response 502, due to the position of the input object over the pixels.

FIG. 5B is a graph illustrating the resulting signal responses received due to the presence of an input object (e.g., finger) at the finger location 340, including estimated parasitic responses 514 associated with pixels 307, 305, 303, 301, 312, 314, and 316, which are positioned a distance from pixels 308 and 318 in a direction into the page of FIG. 5B.

One will note that the parasitic response created by the position of the input object over the trace may vary for each trace location (FIG. 3B), due to the position of the input object relative to the traces. In this example, as shown in FIG. 5B, the input object is positioned closer to pixel 318 versus pixel 308, and thus the measured resulting signal is higher for the traces close to pixel 318 versus 308. An input object also may or may not be covering every trace of transmitters in a transmitter column(s). The traces that are covered may be determined by the finger location 340 of the one or more pixels covered. For example, if the finger is covering pixel 308, then the traces coupled to pixels 307, 306, 305, 304, 303, 302, and 301 may only be covered. Likewise, if the finger is covering pixel 318, then traces coupled to pixels 316, 315, 314, 313, 312, and 311 may be covered.

In order to determine which traces an input object covers, the input device interpolates between adjacently positioned pixels (see curve 512), such as pixels 308 and 318. In particular, the input device performs linear approximation to calculate a slope between two pixels and to determine which traces are covered. FIG. 5B shows interpolation between pixel 308 and pixel 318 (see curve 512). As described above, the input device 100 generates a sensing image of the sensor array 300. Then, the input device 100 begins analyzing the sensing image of the sensor array 300 starting at the row closest to the bonding area 352. For example, referring to FIG. 3B, the input device 100 analyzes from the row 1 to row 8. After analyzing row 1, the input device will have measured the pixel response 502 at pixel 308 and the pixel response 504 at pixel 318.

A reason the input device analyzes starting from a known position, such as the bonding area, is because sensor array set 300 may be receiving input from multiple fingers at multiple locations and, thus, analyzing in one direction or another (e.g., upwards or downwards) may help the systematic generation of a sensing image. In this example, starting the analysis from the bonding area enables the input device to estimate and correct parasitic response in an accurate and logical manner. Also, while the discussion below primarily discloses a finger as the input object, this is not intended to be limiting as to the scope of the invention disclosed herein, since the finger discussed below could be any type of input object (e.g., pen) without deviating from the basic scope of the invention disclosed herein.

Example Equations for Correcting Parasitic Response

The following discussion describes equations for removing the parasitic response from a sensing image created by an array of sensing elements 121 (e.g., pixels) disposed in a sensing region 120 of an input device 100. For explanatory purposes in this example, a finger is located over the input device 100 at a finger location 340, as discussed above with reference to FIG. 3C. Based on the position of the finger location 340, the input device 100 detects responses at pixel 308 and pixel 318. However, the input device also detects parasitic responses due to the traces that are also covered by the finger at the finger location 340. As further described below, input data for the equations for correcting parasitic response for a particular pixel includes the following: a response at pixel 308, a response at pixel 318, a number of traces between pixels 308 and 318 (e.g., to determine slope of a line between the pixels 308 and 318), and the location (e.g., Trace Location) of the particular pixel's trace. Based on these inputs, the input device 100 can use the equations provided below to estimate a parasitic response associated with the particular pixel and then remove (e.g., correct) that estimated parasitic response from a previously measured response to correct for the unwanted parasitic effects caused by the position of the input object.

In some configurations, the input device 100 uses the equations provided below to remove the parasitic response by analyzing the resulting signals measured along a single direction that is aligned relative to the analyzing direction and/or along an axis of symmetry in the sensor array set 300. For sensor array sets that contain arrays of sensor electrodes that are mirrored about an axis, such as an axis passing through the length of the receiver electrodes in FIGS. 3A-3C (e.g., perpendicular to the receiver electrodes), the input device 100 can apply a similar parasitic response correction to one side of the sensor array, and then apply the parasitic response correction to the other side of sensor array. A mirrored sensor configuration may have a bonding area on two opposing sides of a sensor array with a "mirrored" sensor array set (e.g., mirrored transmitter electrodes) between the two bonding areas. In this example, the "opposite" end of the sensor array set 300 refers to either the transmitter row furthest from the bonding area 352 (e.g., for single-sided routing) or the last transmitter row before the mirrored location (e.g., for mirrored sensors).

The equations and definitions discussed below apply to the single direction of routing (e.g., traces/routing extend from one side of the sensing region), which is either the entire sensor array set 300 (for single-sided routing), or a portion extending from the bonding area 352 to a mirrored location (e.g., for mirrored sensors). While the equations described below have been generated for use with to the sensor electrode patterns illustrated in FIGS. 3A-3C, this configuration is not intended to be limiting as to the scope of the invention described herein, since one skilled in the art will appreciate that other similar equations can be used for other sensor electrode patterns, such as the sensor electrode patterns illustrated in FIG. 2A.

The following definitions are used herein:

$P_{t,r}$=pixel response or resulting signal for a specific transmitter t and receiver r $C_{t,r}$=parasitic response correction amount that is subtracted from $P_{t,r}$ $T_{total}$=total number of transmitter electrodes $T_N$=transmitter number (related to position), where $0 \leq N < T_{total}$ I=trace index, a discretized potential trace location, from left to right, where $1 \leq I < T_N$ (e.g., FIG. 3B)

L=location of a trace index relative to a left boundary of a pixel column

If the trace is close to the left boundary of the column, the location is equal to the trace index (e.g., FIG. 3B)

$R_I$=estimated parasitic response on trace index I

In order to properly remove parasitic response from the measured resulting signals, the input device 100 needs to analyze the sensing image and adjust the measured resulting signals that are associated with the transmitters that are coupled to the traces that are covered by the input object. Accordingly, the input device 100 then determines which traces are covered, for example, the traces that are disposed between two given columns of transmitter electrodes (e.g., shown in FIGS. 3A-3C). The input device 100 then interpolates a line between two covered pixels on a given transmitter row. Values along the interpolated line include estimates of parasitic responses on the traces between the two pixels. Next, knowing the position of each trace along the interpolated line will allow the input device to determine the estimated parasitic response for each trace. The estimated parasitic response can then be combined with the measured resulting signal for that trace and pixel to correct for the measured parasitic response associated with that pixel.

Referring again to FIG. 3B, starting from the bonding area, one will note that one less transmitter trace is required each successive row as one moves in a direction extending from the bonding area (e.g., direction in which the row number increases (row 1, 2, 3 . . . 8)), since one trace terminates at a transmitter pad on each row. One will also note that the remaining traces that have not reached their desired row, may be configured, as shown in FIGS. 3B-3C, to shift closer towards their transmitter pad, changing their associated index, 1 (or trace index 1 as discussed above), which can affect the parasitic capacitance measured for the remaining traces, due to their differing positions relative to one row or another. Therefore, in one example if an input object is disposed over pixel 308 (row 1) versus pixel 325 (row 4) the parasitic response seen by the input device 100 due to the interaction with the trace associated with the transmitter electrode in pixel 323 may be different due to its changing trace index. Such an occurrence can be a complicated parameter to calculate. In one configuration, as illustrated in FIGS. 3A-3C, even though not every trace is present on each row, the input device 100 is configured to treat a distance between two pixels as a constant from row to row to ensure consistent pixel response across the sensing region and/or simplicity of calculation.

Referring again to FIG. 5B, the input device 100 can calculate a slope of a curve 512 (i.e., interpolated line) by using a number of transmitters ($T_{total}$) between two adjacent pixel responses ($P_{t,r}$ and $P_{t,r-1}$). For example, a slope may be defined according to Equation 1 below:

$$\text{Interpolated Response Slope, } m = \frac{P_{t,r} - P_{t,r-1}}{T_{total}} \quad \text{(Equation 1)}$$

For example, a slope of curve 512 equals pixel response 504 (e.g., resulting signal measured at pixel 318) minus pixel response 502 (e.g., resulting signal measured at pixel 308) divided by eight transmitters.

The parasitic response on each trace in a particular transmitter row can be estimated using the slope and the trace index I, as described by Equation 2 below.

$$R_I \approx P_{t,r-1} + (I \times m) \quad \text{(Equation 2)}$$

For example, the parasitic response on index I is estimated to be about equal to pixel response 504 plus index I times slope m, where $P_{t,r-1}$ is the pixel response from which the interpolated line starts (e.g., pixel 308 in FIG. 5A). For instance, referring to FIG. 3B, pixel 303 is associated with a trace that is six traces indexes away from pixel 318. Accordingly, the estimated the parasitic response on index six (e.g., six trace indexes away from pixel 318) is estimated to be about equal to pixel response 504 (see FIG. 5B) plus six times slope m. In this case, the slope m in this example is negative. So, the estimated parasitic response at six indexes away from pixel 318 is less than response 504 and greater than the response from pixel 308 (e.g., response 502).

If the estimated parasitic response $R_I$ is greater than a predetermined threshold (e.g., zero), then the input device interprets the estimated parasitic response $R_I$ as corresponding to a covered trace. The input device needs to adjust the pixel response created by the corresponding trace accordingly. If the location of each trace between two sensor electrode columns 371 changes from transmitter row to transmitter row, so the transmitter number $T_N$ is not equal to the trace index I (e.g., $T_N$=I). Referring to FIG. 3B, circles 361 and 362 are examples of where transmitter traces change their location when moving in a direction perpendicular to the layout of the rows 1-8. Circle 361 covers an area in which a trace location 3 on a left side is no longer present, and the remaining valid trace locations include (from left to right) [1,2,2,1]. Similarly, circle 362 covers an area in which a trace location 3 on a left is no longer present, leaving [1,2,3,2,1] as the remaining valid trace locations. Even though location numbers change, the index numbers remain constant because the index numbers describe the distance between receiver columns, discretized by total number of traces, r (e.g., trace positions). The corrected pixel response ($P_{t(i),r}$*) can then be defined as shown in equation 3 below.

$$P_{t(j),r}^* = P_{t(i),r} - R_I \quad \text{(Equation 3)}$$

The following description provides ways to improve the accuracy of the estimated parasitic response $R_I$ to improve the accuracy correction amount, which is defined as the improved estimated parasitic response ($R_I$**). If a trace is covered, thereby causing a parasitic response, a percentage of the pixel response (e.g., the parasitic response) needs to be adjusted from the corresponding pixel response, $P_{t(i),r}$, as described by Equation 4 below:

$$R_I^{**} = R_I \times \text{Parasitic-Scale-Factor} \quad \text{(Equation 4)}$$

The corrected pixel response ($P_{t(j),r}$**) can be defined as shown in equation 5 below.

$$P_{t(i),r}^{} = P_{t(i),r} - R_I^{} \quad \text{(Equation 5)}$$

Accordingly, the input device can calculate an updated pixel response ($P_{t(i),r}$**) for a pixel location by subtracting a percentage of the estimated parasitic response from the measured pixel response (equation 5). The parasitic scale factor can account for differences in the physical attributes of a trace, for example, the "parasitic scale factor" may differ as a function of the trace width, which may vary due to its position (e.g., particular trace location) and be determined by performing tests on assembled input devices. In one example, the "parasitic scale factor" is determined by comparing the number of traces disposed between two or more pixels and determining the width of each of these pixels to determine a "parasitic scale factor" for each trace.

However, the couplings between the traces and the receiver electrodes will vary depending on their distance apart, which is described by the trace index I term. The amount a given pixel needs to be corrected due to parasitic coupling (e.g., Location-Scale Factor which may be empirically determined), is a function of the location of the trace and the estimated response, as described by Equations 6 and 7 below:

$$L = \begin{cases} I, & \text{if } I \leq \text{Left Half} \\ T_{total} - I - 1, & \text{if } I > \text{Right Half} \end{cases} \quad \text{(Equation 6)}$$

$$C_{t,r} = \quad \text{(Equation 7)}$$
$$R_I \times \text{Parasitic-Scale-Factor} - [L \times \text{Location-Scale-Factor}]$$

The two scale factors (e.g., parasitic scale factor and location scale factor) vary from pixel to pixel. The two scale factors depend on the transmitter trace widths, which affects the amount of capacitive coupling each trace has to the receiver electrode(s), and the distance between the traces and the receiver electrode(s). In one embodiment, the input device can directly calculate the scale factors based on the number of traces and widths of the traces. Accordingly, the input device 100 can improve accuracy of estimating parasitic response by directly taking trace widths into account. The corrected pixel response ($P_{t(i),r}$***) can thus be defined as shown in equation 8 below.

$$P_{t(i),r}\text{***}=P_{t(i),r}-C_{t,r} \quad \text{(Equation 8)}$$

In some configurations, another scale factor, which accounts for the variation in parasitic response due to the amount of material stack-up (e.g., glass or air gap) over of traces. The amount of material stack-up on top of a trace affects the capacitance change that occurs when a finger covers the trace and a corresponding receiver. In this case the accuracy of the estimated parasitic response $R_I$ can be improved by multiplying the estimated parasitic response times the "material stack-up" factor, which may be determined by experiments/testing of a formed input device.

FIG. 5C is a graph illustrating the resulting signal response received due to the presence of an input object (e.g., finger), including pixel response 520 and 524 and estimated parasitic responses 525 associated with pixels 305, 303, 301, 312, and 314. For explanatory purposes, FIG. 5C is based on an additional input object that is at a location that is different from the finger location 340 shown in FIG. 3C. Instead, for FIG. 5C, an assumption is that pixel 316 is the only pixel that is at least partially covered by the additional input object. As described above, the input device 100 analyzes the sensor array 300 starting at the bonding area 352. For example, referring to FIG. 3B, the input device 100 analyzes from the row 1 to row 8. At the analysis of row 3, the input device has previously corrected the estimated parasitic responses from rows 1 and 2 (FIG. 5B) from the measured pixel responses to obtain updated pixel responses in row 3.

Accordingly, the input device continues to estimate and correct parasitic responses associated with the analysis of row 3 (FIG. 5C) in a similar manner to the correction operations associated with the analysis of row 2 (FIG. 5B). In FIG. 5C, the input device calculates a curve 522 to estimate parasitic responses. The input device can recursively estimate and correct parasitic responses for other rows (e.g., row 4 to row 7). For example, the input device 100 uses one or more of the Equations 1-8 for each row starting from the row closest to the bonding area. Accordingly, a correction to a particular pixel is a sum of calculated correction amounts as the input device analyzes each row individually. Such analysis, starting from the bonding area outward, the input device can correctly handle a multi-touch situation (e.g., two or more fingers covering two more or more different locations of the sensor array set 300).

Method Overview

Figure 6:
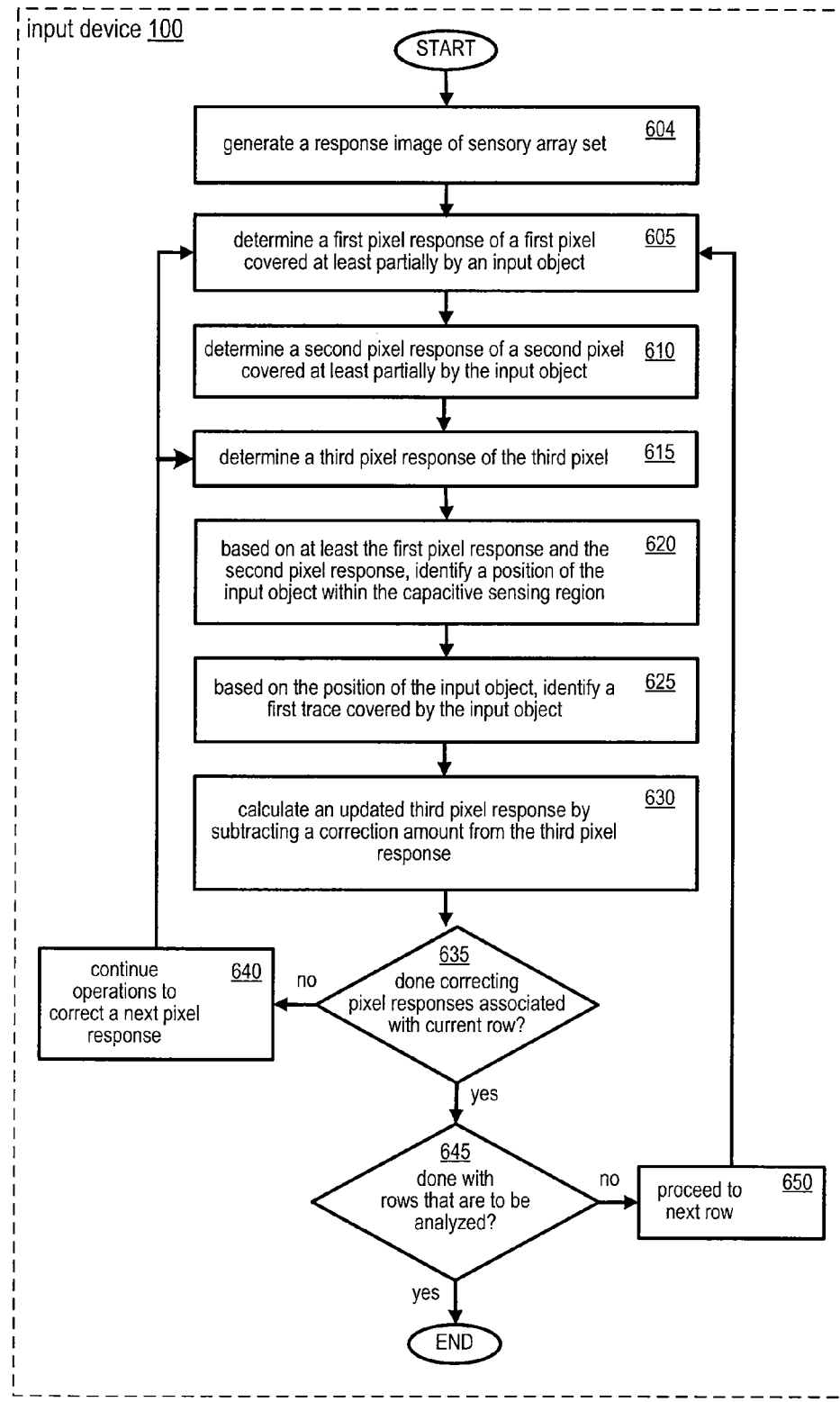
FIG. 6 is a flow chart that illustrates a method of sensing a position of an input object, according to one or more embodiments described herein.

FIG. 6 is a flowchart of a method 600 to sense a position of an input object, according to one or more embodiments described herein. For explanatory purposes, the input device 100 performs one or more of the steps of the method 600. However, the method 600 is not so limited. Other devices may alternatively, or additionally, perform at least some steps in the method 600.

The method starts at step 604, where the input device 100 generates a sensing image of the sensor array set 300. At step 605, the input device 100 analyzes the sensing image and determines a first pixel response of a first pixel is covered at least partially by an input object. At step 610, the input device 100 continues analyzing and determines a second pixel response of a second pixel is covered at least partially by the input object. At step 615, the input device 100 continues analyzing and determines a third pixel response of a third pixel. The first pixel, the second pixel, and the third pixel are disposed within a capacitive sensing region 120 of a touch sensor device.

At step 620, based on at least the first pixel response and the second pixel response, the input device 100 identifies a position of the input object within the capacitive sensing region. For example, referring to FIG. 4A, the input device 100 can identify a position by a measuring response 402, which surpasses a predetermined threshold response level. The measure response 402 also enables the system to identify that pixels 308 and 318 are covered. At step 625, based on the position of the input object over the sensing region 120, the input device 100 identifies a first trace covered by the input object. For example, the covered pixel 308 includes at least one trace that is also covered. The covered pixel 308 includes four covered adjacent traces for consideration (e.g., trace associated with pixels 301, 303, 305 and 307 in FIG. 3B). However, this method example describes one covered trace for simplicity of explanation. At step 630, the input device 100 calculates an updated third pixel response ($P_{t(3),r}$*, $P_{t(3),r}$ or $P_{t(3),r}$*) by subtracting a correction amount ($R_I$, $R_I$* or $C_{t,r}$) from the third pixel response ($P_{t(3),r}$). For example, Equation 3 above describes the corrected parasitic response ($P_{t(3),r}$*) formed by subtracting the parasitic response ($R_I$) from the measured third pixel response ($P_{t(3),r}$). Depending on the desired accuracy, or due to computational power limitations, the input device 100 may select and/or use either equation 3, 5 or 8, to determine the desired corrected pixel response, which can then in subsequent steps be used to determine the position of one or more input objects over the sensing region 120.

Then, in decision operation 635, the input device 100 determines if operations are complete for correcting pixel responses associated with the current row. If there are more pixel responses to be corrected, then the method 600 moves to step 640 where the input device 100 continues operations to correct a next pixel response. After performing step 640 the process may then continue to step 605 or step 615, and then proceed on with the sequence of process steps again. In such a case, the input device 100 can further correct a pixel response to which the input device 100 previously applied a correction. However, if there are no more pixel responses to be corrected, then the method 600 moves to a decision operation 645 where the input device 100 determines if operations are complete for all rows that are to be analyzed. The correction for a row is complete when no more parasitic responses can be associated with a pixel in that row. If there are more rows to be analyzed, then the method 600 moves to step 650 where the input device 100 proceeds to a next row. The method 600 then continues at step 605 to correct the next pixel response of the next row. However, if there are no more rows to be analyzed, then the method 600 is complete.

The method 600 may include other steps and/or details that are not described in this method overview. Other steps and/or details are described with reference to other figures and may be a part of the method 600, depending on the implementation.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. A computer-implemented method of sensing a position of an input object, comprising:
   determining a first pixel response of a first pixel covered at least partially by an input object;
   determining a second pixel response of a second pixel covered at least partially by the input object;
   determining a third pixel response of a third pixel, wherein the first pixel, the second pixel, and the third pixel are disposed within a capacitive sensing region of a touch sensor device;
   based on at least the first pixel response and the second pixel response, identifying a position of the input object within the capacitive sensing region;
   based on the position of the input object, determining that the input object is positioned near a first trace, wherein the first trace is associated with the third pixel;
   calculating an updated third pixel response by:
      generating a pixel response line segment between the first pixel and the second pixel by interpolating a line across a distance between the first pixel and the second pixel using information received from the first pixel response and the second pixel response,
      calculating a number of traces between the first pixel and the second pixel, wherein a length of the pixel response line segment is related to the number of traces disposed between the first pixel and the second pixel, and wherein the location of the first trace is between the first pixel and the second pixel,
      calculating a difference between the first pixel response and the second pixel response,
      calculating a slope of the pixel response line segment by dividing the difference by the number of traces between the first pixel and the second pixel,
      calculating a correction amount based on a location of the first trace along the pixel response line segment, and
      removing the correction amount from the third pixel response, the correction amount being based on the determination that the input object is positioned near the first trace.

2. The method of claim 1, wherein the sensor is a single layer sensor.

3. The method of claim 1, further comprising:
   determining a fourth pixel response of a fourth pixel, wherein the fourth pixel is disposed within the capacitive sensing region of the touch sensor device;
   based on the position of the input object, determining that the input object is positioned near a second trace, wherein the second trace is associated with the fourth pixel; and
   calculating an updated fourth pixel response by subtracting another correction amount from the fourth pixel response after determining that the input object is positioned near the second trace.

4. The method of claim 1, wherein the updated third pixel response is associated with an analysis of a first row of the capacitive sensing region, the method further comprising:
   proceeding to a second row of the capacitive sensing region;
   determining a fourth pixel response of a fourth pixel associated with an analysis of a second row of the capacitive sensing region, wherein the fourth pixel is disposed within the capacitive sensing region of the touch sensor device;
   based on the position of the input object, determining that the input object is positioned near a second trace, wherein the second trace is associated with the fourth pixel; and
   calculating an updated fourth pixel response by subtracting another correction amount from the fourth pixel response after determining that the input object is positioned near the second trace.

5. A computer-implemented method of sensing a position of an input object, comprising:
   determining a first pixel response of a first pixel covered at least partially by an input object;
   determining a second pixel response of a second pixel covered at least partially by the input object;
   determining a third pixel response of a third pixel, wherein the first pixel, the second pixel, and the third pixel are disposed within a capacitive sensing region of a touch sensor device;
   based on at least the first pixel response and the second pixel response, identifying a position of the input object within the capacitive sensing region;
   based on the position of the input object, determining that the input object is positioned near a first trace, wherein the first trace is associated with the third pixel; and
   calculating an updated third pixel response by removing a correction amount from the third pixel response, the correction amount being based on the determination that the input object is positioned near the first trace,
   wherein calculating the updated third pixel response further comprises:
      calculating a number of covered traces;
      calculating a width of each covered trace; and
      based on the number of covered traces and the width of each covered trace, calculating a parasitic scale factor and a location scale factor for the correction amount.

6. A non-transitory computer readable storage medium comprising instructions that in response to execution by a computing device cause the computing device to perform operations, comprising:
   determining a first pixel response of a first pixel covered at least partially by an input object;
   determining a second pixel response of a second pixel covered at least partially by the input object;
   determining a third pixel response of a third pixel, wherein the first pixel, the second pixel, and the third pixel are disposed within a capacitive sensing region of a touch sensor device;
   based on at least the first pixel response and the second pixel response, identifying a position of the input object within the capacitive sensing region;
   based on the position of the input object, determining that the input object is positioned near a first trace, wherein the first trace is associated with the third pixel; and
   calculating an updated third pixel response by:
      generating a pixel response line segment between the first pixel and the second pixel by interpolating a line across a distance between the first pixel and the second pixel using information received from the first pixel response and the second pixel response,
      calculating a number of traces between the first pixel and the second pixel, wherein a length of the pixel response line segment is related to the number of traces disposed between the first pixel and the second pixel, and wherein the location of the first trace is between the first pixel and the second pixel, calculating a difference between the first pixel response and the second pixel response, calculating a slope of the pixel response line segment by dividing the difference by the number of traces between the first pixel and the second pixel, calculating a correction amount based on a location of the first trace along the pixel response line segment, and subtracting the correction amount from the third pixel response, the correction amount being based on the determination that the input object is positioned near the first trace.

7. The non-transitory computer readable storage medium of claim 6, wherein the sensor is a single layer sensor.

8. The non-transitory computer readable storage medium of claim 6, further comprising:

determining a fourth pixel response of a fourth pixel, wherein the fourth pixel is disposed within the capacitive sensing region of the touch sensor device;

based on the position of the input object, determining that the input object is positioned near a second trace, wherein the second trace is associated with the fourth pixel; and calculating an updated fourth pixel response by subtracting another correction amount from the fourth pixel response after determining that the input object is positioned near the second trace.

9. The non-transitory computer readable storage medium of claim 6, wherein the updated third pixel response is associated with an analysis of a first row of the capacitive sensing region, the method further comprising:

proceeding to a second row of the capacitive sensing region;

determining a fourth pixel response of a fourth pixel associated with an analysis of a second row of the capacitive sensing region, wherein the fourth pixel is disposed within the capacitive sensing region of the touch sensor device;

based on the position of the input object, determining that the input object is positioned near a second trace, wherein the second trace is associated with the fourth pixel; and calculating an updated fourth pixel response by subtracting another correction amount from the fourth pixel response after determining that the input object is positioned near the second trace.

10. A method of sensing a position of an input object within a sensing region of an input device, comprising:

measuring a first capacitance signal generated by a first pixel that is covered at least partially by an input object;

measuring a second capacitance signal generated by a second pixel that is covered at least partially by the input object;

measuring a third capacitance signal generated by a third pixel;

based on at least the first capacitance signal and the second capacitance signal, identifying a position of the input object within the sensing region;

based on the position of the input object, determining that the input object is positioned near a trace, wherein the trace is associated with the third pixel;

generating a correction amount by a process that comprises:

generating a pixel response line segment between the first pixel and the second pixel by interpolating a line across a distance between the first pixel and the second pixel using the first capacitance signal and the second capacitance signal; and based on a location of the trace along the pixel response line segment, determining the correction amount;

calculating a number of traces between the first pixel and the second pixel, wherein a length of the pixel response line segment is represented by the number of traces between the first pixel and the second pixel, and wherein the location of the first trace is between the first pixel and the second pixel; and calculating an updated third capacitance signal by subtracting the correction amount from the third capacitance signal, the correction amount being based on the determination that the input object is positioned near the trace, wherein calculating the updated third pixel response further comprises:

calculating a number of covered traces;

calculating a width of each covered trace; and based on the number of covered traces and the width of each covered trace, calculating a parasitic scale factor and a location scale factor for the correction amount.

* * * * *

UNITED STATES PATENT AND TRADEMARK OFFICE
CERTIFICATE OF CORRECTION

PATENT NO. : 9,495,046 B2
APPLICATION NO. : 14/061593
DATED : November 15, 2016
INVENTOR(S) : Moore et al.

It is certified that error appears in the above-identified patent and that said Letters Patent is hereby corrected as shown below:

In the Specification

Column 16, Line 24, delete "$E_{31}$" and insert -- $E_{S1}$ --, therefor;

Column 16, Line 27, delete "$E_{S1}$" and insert -- $E_{S2}$ --, therefor;

Column 24, Line 15, delete "r" and insert -- $T_N$ --, therefor;

Column 24, Line 19, delete "$P_{t(j),r}{*}=P_{t(i),r}-R_l$" and insert -- $P_{t(i),r}{*}=P_{t(i),r}-R_l$ --, therefor;

Column 24, Line 30, delete "$(P_{t(j),r})$" and insert -- $(P_{t(i),r})$ --, therefor.

Signed and Sealed this
Ninth Day of May, 2017

Michelle K. Lee
*Director of the United States Patent and Trademark Office*